(12) United States Patent
Beckhardt

(10) Patent No.: US 11,188,621 B2
(45) Date of Patent: *Nov. 30, 2021

(54) SHARE RESTRICTION FOR CURATED PLAYLISTS

(71) Applicant: Sonos, Inc., Santa Barbara, CA (US)

(72) Inventor: Steven Beckhardt, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/846,620

(22) Filed: Apr. 13, 2020

(65) Prior Publication Data

US 2020/0342072 A1 Oct. 29, 2020

Related U.S. Application Data

(63) Continuation of application No. 16/174,703, filed on Oct. 30, 2018, now Pat. No. 10,621,310, which is a
(Continued)

(51) Int. Cl.
*G06F 21/10* (2013.01)
*H04L 29/06* (2006.01)
(Continued)

(52) U.S. Cl.
CPC .......... *G06F 21/10* (2013.01); *G06F 21/6218* (2013.01); *H04L 65/403* (2013.01);
(Continued)

(58) Field of Classification Search
CPC ..... H04L 65/80; H04L 65/4084; H04L 67/10; H04L 65/403; G06F 21/10; G06F 21/6218; H04W 4/33
See application file for complete search history.

(56) References Cited

U.S. PATENT DOCUMENTS 4,296,278 A 10/1981 Cullison et al.
4,816,989 A 3/1989 Finn et al.
(Continued)

FOREIGN PATENT DOCUMENTS

CN 101410773 A 4/2009
CN 101714156 A 5/2010
(Continued)

OTHER PUBLICATIONS

Advisory Action dated Feb. 1, 2017, issued in connection with U.S. Appl. No. 14/297,193, filed Jun. 5, 2014, 6 pages.
(Continued)

*Primary Examiner* — Farid Homayounmehr
*Assistant Examiner* — Suman Debnath
(74) *Attorney, Agent, or Firm* — Akerman LLP

(57) ABSTRACT

Example techniques facilitate for applying a share restriction to a curated playlist within a shared playback queue. In example implementations, a first media playback system may share its playback queue with a second media playback system. The playback queue of the first media playback system may include a curated playlist associated with a share restriction. When sharing its playback queue of the first media playback system, the first media playback system may enforce the share restriction on the curated playlist as queued in a second playback queue of the second media playback system.

20 Claims, 10 Drawing Sheets

Related U.S. Application Data continuation of application No. 14/275,112, filed on May 12, 2014, now abandoned.

(51) Int. Cl.
  *H04L 29/08* (2006.01)
  *G06F 21/62* (2013.01)
  *H04W 4/33* (2018.01)

(52) U.S. Cl.
  CPC .......... *H04L 65/4084* (2013.01); *H04L 65/80* (2013.01); *H04L 67/10* (2013.01); *H04W 4/33* (2018.02)

(56) References Cited

U.S. PATENT DOCUMENTS

| | | |
|---|---|---|
| 5,182,552 A | 1/1993 | Paynting |
| 5,239,458 A | 8/1993 | Suzuki |
| 5,299,266 A | 3/1994 | Lumsden |
| 5,406,634 A | 4/1995 | Anderson et al. |
| 5,440,644 A | 8/1995 | Farinelli et al. |
| 5,467,342 A | 11/1995 | Logston et al. |
| 5,491,839 A | 2/1996 | Schotz |
| 5,553,222 A | 9/1996 | Milne et al. |
| 5,563,946 A | 10/1996 | Cooper et al. |
| 5,668,884 A | 9/1997 | Clair, Jr. et al. |
| 5,673,323 A | 9/1997 | Schotz et al. |
| 5,751,819 A | 5/1998 | Dorrough |
| 5,761,320 A | 6/1998 | Farinelli et al. |
| 5,774,666 A | 6/1998 | Portuesi |
| 5,808,662 A | 9/1998 | Kinney et al. |
| 5,815,689 A | 9/1998 | Shaw et al. |
| 5,856,827 A | 1/1999 | Sudo |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 5,956,088 A | 9/1999 | Shen et al. |
| 6,002,862 A | 12/1999 | Takaike |
| 6,009,457 A | 12/1999 | Moller |
| 6,026,150 A | 2/2000 | Frank et al. |
| 6,031,818 A | 2/2000 | Lo et al. |
| 6,032,202 A | 2/2000 | Lea et al. |
| 6,108,686 A | 8/2000 | Williams, Jr. |
| 6,128,318 A | 10/2000 | Sato |
| 6,157,957 A | 12/2000 | Berthaud |
| 6,175,872 B1 | 1/2001 | Neumann et al. |
| 6,181,316 B1 | 1/2001 | Little et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,255,961 B1 | 7/2001 | Van et al. |
| 6,256,554 B1 | 7/2001 | Dilorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,349,339 B1 | 2/2002 | Williams |
| 6,351,821 B1 | 2/2002 | Voth |
| 6,404,811 B1 | 6/2002 | Cvetko et al. |
| 6,430,353 B1 | 8/2002 | Honda et al. |
| 6,469,633 B1 | 10/2002 | Wachter et al. |
| 6,487,296 B1 | 11/2002 | Allen et al. |
| 6,522,886 B1 | 2/2003 | Youngs et al. |
| 6,526,325 B1 | 2/2003 | Sussman et al. |
| 6,587,127 B1 | 7/2003 | Leeke et al. |
| 6,594,691 B1 | 7/2003 | Mccollum et al. |
| 6,598,172 B1 | 7/2003 | Vandeusen et al. |
| 6,611,537 B1 | 8/2003 | Edens et al. |
| 6,631,410 B1 | 10/2003 | Kowalski et al. |
| 6,674,803 B1 | 1/2004 | Kesselring |
| 6,728,531 B1 | 4/2004 | Lee et al. |
| 6,732,155 B2 | 5/2004 | Meek |
| 6,757,517 B2 | 6/2004 | Chang et al. |
| 6,778,869 B2 | 8/2004 | Champion |
| 6,826,283 B1 | 11/2004 | Wheeler et al. |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 6,985,694 B1 | 1/2006 | De Bonet et al. |
| 7,007,106 B1 | 2/2006 | Flood et al. |
| 7,017,118 B1 | 3/2006 | Carroll |
| 7,020,048 B2 | 3/2006 | Mccomas |
| 7,020,791 B1 | 3/2006 | Aweya et al. |
| 7,043,651 B2 | 5/2006 | Aweya et al. |
| 7,047,308 B2 | 5/2006 | Deshpande |
| 7,113,833 B1 | 9/2006 | Brown et al. |
| 7,113,999 B2 | 9/2006 | Pestoni et al. |
| 7,115,017 B1 | 10/2006 | Laursen et al. |
| 7,117,451 B2 | 10/2006 | Sielken |
| 7,124,125 B2 | 10/2006 | Cook et al. |
| 7,130,608 B2 | 10/2006 | Hollstrom et al. |
| 7,130,616 B2 | 10/2006 | Janik |
| 7,143,141 B1 | 11/2006 | Morgan et al. |
| 7,143,939 B2 | 12/2006 | Henzerling |
| 7,162,315 B2 | 1/2007 | Gilbert |
| 7,185,090 B2 | 2/2007 | Kowalski et al. |
| 7,187,947 B1 | 3/2007 | White et al. |
| 7,206,367 B1 | 4/2007 | Moore et al. |
| 7,209,795 B2 | 4/2007 | Sullivan et al. |
| 7,218,708 B2 | 5/2007 | Berezowski et al. |
| 7,236,739 B2 | 6/2007 | Chang et al. |
| 7,236,773 B2 | 6/2007 | Thomas |
| 7,281,034 B1 | 10/2007 | Eyal |
| 7,293,060 B2 | 11/2007 | Komsi |
| 7,295,548 B2 | 11/2007 | Blank et al. |
| 7,302,468 B2 | 11/2007 | Wijeratne |
| 7,312,785 B2 | 12/2007 | Tsuk et al. |
| 7,324,857 B2 | 1/2008 | Goddard |
| 7,333,519 B2 | 2/2008 | Sullivan et al. |
| 7,358,960 B2 | 4/2008 | Mak |
| 7,372,846 B2 | 5/2008 | Zwack |
| 7,391,791 B2 | 6/2008 | Balassanian et al. |
| 7,392,102 B2 | 6/2008 | Sullivan et al. |
| 7,483,538 B2 | 1/2009 | Mccarty et al. |
| 7,483,958 B1 | 1/2009 | Elabbady et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,574,274 B2 | 8/2009 | Holmes |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,644 B1 | 2/2010 | Zheng |
| 7,657,910 B1 | 2/2010 | Mcaulay et al. |
| 7,668,990 B2 | 2/2010 | Krzyzanowski et al. |
| 7,669,219 B2 | 2/2010 | Scott, III et al. |
| 7,675,943 B2 | 3/2010 | Mosig et al. |
| 7,676,142 B1 | 3/2010 | Hung |
| 7,702,279 B2 | 4/2010 | Ko et al. |
| 7,720,096 B2 | 5/2010 | Klemets |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,788,138 B2 | 8/2010 | Viehmann et al. |
| 7,805,682 B1 | 9/2010 | Lambourne |
| 7,835,689 B2 | 11/2010 | Goldberg et al. |
| 7,853,341 B2 | 12/2010 | Mccarty et al. |
| 7,865,137 B2 | 1/2011 | Goldberg et al. |
| 7,885,622 B2 | 2/2011 | Krampf et al. |
| 7,916,877 B2 | 3/2011 | Goldberg et al. |
| 7,917,082 B2 | 3/2011 | Goldberg et al. |
| 7,921,369 B2 | 4/2011 | Bill |
| 7,934,239 B1 | 4/2011 | Dagman |
| 7,987,294 B2 | 7/2011 | Bryce et al. |
| 7,996,566 B1 | 8/2011 | Sylvain et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |

(56) References Cited

U.S. PATENT DOCUMENTS

| | | |
|---|---|---|
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,103,009 B2 | 1/2012 | Mccarty et al. |
| 8,112,032 B2 | 2/2012 | Ko et al. |
| 8,131,390 B2 | 3/2012 | Braithwaite et al. |
| 8,169,938 B2 | 5/2012 | Duchscher et al. |
| 8,200,602 B2 | 6/2012 | Farrelly |
| 8,214,873 B2 | 7/2012 | Weel |
| 8,230,099 B2 | 7/2012 | Weel |
| 8,234,395 B2 | 7/2012 | Millington |
| 8,271,115 B2 | 9/2012 | Yoshida |
| 8,290,603 B1 | 10/2012 | Lambourne |
| 8,315,555 B2 | 11/2012 | Ko et al. |
| 8,370,678 B2 | 2/2013 | Millington et al. |
| 8,423,659 B2 | 4/2013 | Millington |
| 8,483,853 B1 | 7/2013 | Lambourne |
| 8,521,316 B2 | 8/2013 | Louboutin |
| 8,588,949 B2 | 11/2013 | Lambourne et al. |
| 8,613,385 B1 | 12/2013 | Hulet et al. |
| 8,666,826 B2 | 3/2014 | Narayanan et al. |
| 8,775,546 B2 | 7/2014 | Millington |
| 8,826,135 B1 | 9/2014 | Durham et al. |
| 8,843,500 B2 | 9/2014 | Nogues et al. |
| 8,892,648 B1 | 11/2014 | Durham et al. |
| 8,910,265 B2 | 12/2014 | Lang et al. |
| 8,942,252 B2 | 1/2015 | Balassanian et al. |
| 8,990,701 B2 | 3/2015 | Olofsson |
| 9,052,810 B2 | 6/2015 | Reimann et al. |
| 9,137,564 B2 | 9/2015 | Reimann |
| 9,165,255 B1 * | 10/2015 | Shetty .................. H04N 21/233 |
| 9,229,938 B1 | 1/2016 | Jaini et al. |
| 9,246,866 B1 | 1/2016 | Sanders |
| 9,247,363 B2 | 1/2016 | Triplett et al. |
| 9,286,384 B2 | 3/2016 | Kuper et al. |
| 9,344,292 B2 | 5/2016 | Griffiths et al. |
| 9,374,607 B2 | 6/2016 | Bates et al. |
| 9,478,247 B2 | 10/2016 | Chen et al. |
| 9,489,383 B2 | 11/2016 | Hyman et al. |
| 9,510,055 B2 | 11/2016 | Kuper et al. |
| 9,524,338 B2 | 12/2016 | Van et al. |
| 9,654,821 B2 | 5/2017 | Coburn, IV et al. |
| 9,665,339 B2 | 5/2017 | Reimann et al. |
| 9,674,587 B2 | 6/2017 | Triplett et al. |
| 9,680,960 B2 | 6/2017 | Chen et al. |
| 9,696,874 B2 | 7/2017 | Kulick et al. |
| 9,703,521 B2 | 7/2017 | Kumar et al. |
| 9,715,500 B2 | 7/2017 | Cue et al. |
| 9,727,219 B2 | 8/2017 | Kumar et al. |
| 9,756,092 B2 | 9/2017 | Zhang et al. |
| 9,892,118 B2 | 2/2018 | Kumar et al. |
| 9,942,335 B2 | 4/2018 | Schneider et al. |
| 9,977,561 B2 | 5/2018 | Bates et al. |
| 10,032,233 B2 | 7/2018 | Papakipos et al. |
| 10,129,599 B2 | 11/2018 | Van Der Heide |
| 10,157,033 B2 | 12/2018 | Millington |
| 10,275,135 B2 | 4/2019 | Coburn, IV et al. |
| 10,296,884 B2 | 5/2019 | Lang et al. |
| 10,469,897 B2 | 11/2019 | Reimann et al. |
| 10,683,352 B1 | 6/2020 | Kahvejian et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0054134 A1 | 5/2002 | Kelts et al. |
| 2002/0056117 A1 | 5/2002 | Hasegawa et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0116476 A1 | 8/2002 | Eyal et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassetti et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0088875 A1 | 5/2003 | Gay et al. |
| 2003/0099212 A1 | 5/2003 | Anjum et al. |
| 2003/0099221 A1 | 5/2003 | Rhee |
| 2003/0105820 A1 | 6/2003 | Haims et al. |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | Mccarty et al. |
| 2003/0220973 A1 | 11/2003 | Zhu et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0108320 A1 | 5/2005 | Lord et al. |
| 2005/0114538 A1 | 5/2005 | Rose |
| 2005/0125357 A1 | 6/2005 | Saadat et al. |
| 2005/0155072 A1 | 7/2005 | Kaczowka et al. |
| 2005/0166157 A1 | 7/2005 | Ollis et al. |
| 2005/0166258 A1 | 7/2005 | Vasilevsky et al. |
| 2005/0177643 A1 | 8/2005 | Xu |
| 2005/0181348 A1 | 8/2005 | Carey et al. |
| 2005/0195205 A1 | 9/2005 | Abrams, Jr. |
| 2005/0201254 A1 | 9/2005 | Looney et al. |
| 2005/0234875 A1 | 10/2005 | Auerbach et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |

(56) References Cited

U.S. PATENT DOCUMENTS

| | | |
|---|---|---|
| 2006/0095516 A1 | 5/2006 | Wijeratne |
| 2006/0107237 A1 | 5/2006 | Kim |
| 2006/0119497 A1 | 6/2006 | Miller et al. |
| 2006/0143236 A1 | 6/2006 | Wu |
| 2006/0168340 A1 | 7/2006 | Heller et al. |
| 2006/0195462 A1 | 8/2006 | Rogers |
| 2006/0195479 A1* | 8/2006 | Spiegelman ........ G06F 16/3344 |
| 2006/0195480 A1 | 8/2006 | Spiegelman et al. |
| 2006/0253436 A1 | 11/2006 | Cook et al. |
| 2006/0253782 A1 | 11/2006 | Stark et al. |
| 2006/0294074 A1 | 12/2006 | Chang |
| 2007/0033402 A1 | 2/2007 | Williams et al. |
| 2007/0038999 A1 | 2/2007 | Millington |
| 2007/0043847 A1 | 2/2007 | Carter et al. |
| 2007/0048713 A1 | 3/2007 | Plastina et al. |
| 2007/0049256 A1 | 3/2007 | Wassingbo |
| 2007/0054680 A1 | 3/2007 | Mo et al. |
| 2007/0088747 A1 | 4/2007 | Cheng et al. |
| 2007/0136778 A1 | 6/2007 | Birger et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0169115 A1 | 7/2007 | Ko et al. |
| 2007/0180137 A1 | 8/2007 | Rajapakse |
| 2007/0214182 A1 | 9/2007 | Rosenberg |
| 2007/0224937 A1 | 9/2007 | Jung et al. |
| 2007/0271232 A1 | 11/2007 | Mattox et al. |
| 2007/0271388 A1 | 11/2007 | Bowra et al. |
| 2007/0288470 A1 | 12/2007 | Kauniskangas et al. |
| 2007/0294131 A1 | 12/2007 | Roman et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0052371 A1 | 2/2008 | Partovi et al. |
| 2008/0059510 A1 | 3/2008 | Cardamore et al. |
| 2008/0077261 A1 | 3/2008 | Baudino et al. |
| 2008/0086368 A1 | 4/2008 | Bauman et al. |
| 2008/0091771 A1 | 4/2008 | Allen et al. |
| 2008/0109529 A1 | 5/2008 | Story |
| 2008/0120429 A1 | 5/2008 | Millington et al. |
| 2008/0144861 A1 | 6/2008 | Melanson et al. |
| 2008/0152165 A1 | 6/2008 | Zacchi |
| 2008/0154959 A1 | 6/2008 | Dunko |
| 2008/0194276 A1 | 8/2008 | Lin et al. |
| 2008/0301280 A1 | 12/2008 | Chasen et al. |
| 2008/0319833 A1 | 12/2008 | Svendsen |
| 2009/0005893 A1 | 1/2009 | Sugii et al. |
| 2009/0031336 A1 | 1/2009 | Chavez et al. |
| 2009/0041423 A1 | 2/2009 | Weber et al. |
| 2009/0063414 A1 | 3/2009 | White et al. |
| 2009/0076881 A1 | 3/2009 | Svendsen |
| 2009/0076917 A1 | 3/2009 | Jablokov et al. |
| 2009/0083117 A1 | 3/2009 | Svendsen et al. |
| 2009/0133069 A1 | 5/2009 | Conness et al. |
| 2009/0150806 A1 | 6/2009 | Evje et al. |
| 2009/0157905 A1 | 6/2009 | Davis |
| 2009/0175429 A1 | 7/2009 | Cohen et al. |
| 2009/0179867 A1 | 7/2009 | Shim et al. |
| 2009/0216855 A1 | 8/2009 | Lang et al. |
| 2009/0222115 A1 | 9/2009 | Malcolm et al. |
| 2009/0228919 A1 | 9/2009 | Zott et al. |
| 2009/0249222 A1 | 10/2009 | Schmidt et al. |
| 2009/0265426 A1 | 10/2009 | Svendsen et al. |
| 2009/0307062 A1 | 12/2009 | Lutnick et al. |
| 2009/0313369 A1 | 12/2009 | Wormington et al. |
| 2010/0010648 A1 | 1/2010 | Bull et al. |
| 2010/0017366 A1 | 1/2010 | Robertson et al. |
| 2010/0017714 A1 | 1/2010 | Agarwal et al. |
| 2010/0023578 A1 | 1/2010 | Brant et al. |
| 2010/0031366 A1 | 2/2010 | Knight et al. |
| 2010/0036950 A1 | 2/2010 | Bae et al. |
| 2010/0049835 A1 | 2/2010 | Ko et al. |
| 2010/0054275 A1 | 3/2010 | Noonan et al. |
| 2010/0082731 A1 | 4/2010 | Haughay et al. |
| 2010/0094834 A1* | 4/2010 | Svendsen ............ G06F 16/4387 707/705 |
| 2010/0095332 A1 | 4/2010 | Gran et al. |
| 2010/0131567 A1 | 5/2010 | Dorogusker et al. |
| 2010/0162324 A1 | 6/2010 | Mehta et al. |
| 2010/0205222 A1 | 8/2010 | Gajdos et al. |
| 2010/0228740 A1 | 9/2010 | Cannistraro et al. |
| 2010/0235520 A1 | 9/2010 | Attanasio et al. |
| 2010/0262909 A1 | 10/2010 | Hsieh |
| 2010/0284389 A1 | 11/2010 | Ramsay et al. |
| 2010/0299391 A1 | 11/2010 | Demarta et al. |
| 2010/0299639 A1 | 11/2010 | Ramsay et al. |
| 2010/0318917 A1 | 12/2010 | Holladay et al. |
| 2010/0325218 A1 | 12/2010 | Castro et al. |
| 2010/0332326 A1 | 12/2010 | Ishai |
| 2011/0004330 A1 | 1/2011 | Rothkopf et al. |
| 2011/0041080 A1 | 2/2011 | Fleischman et al. |
| 2011/0066941 A1 | 3/2011 | Chipchase et al. |
| 2011/0066943 A1 | 3/2011 | Brillon et al. |
| 2011/0087842 A1 | 4/2011 | Lu et al. |
| 2011/0119706 A1 | 5/2011 | Scott et al. |
| 2011/0154173 A1 | 6/2011 | Herlein |
| 2011/0196888 A1 | 8/2011 | Hanson et al. |
| 2011/0202430 A1 | 8/2011 | Narayanan et al. |
| 2011/0202842 A1 | 8/2011 | Weatherly et al. |
| 2011/0211534 A1 | 9/2011 | Schmidt et al. |
| 2011/0225417 A1 | 9/2011 | Maharajh et al. |
| 2011/0238755 A1 | 9/2011 | Khan et al. |
| 2011/0246383 A1 | 10/2011 | Gibson et al. |
| 2011/0264732 A1 | 10/2011 | Robbin et al. |
| 2011/0314388 A1 | 12/2011 | Wheatley |
| 2012/0029671 A1 | 2/2012 | Millington et al. |
| 2012/0030366 A1 | 2/2012 | Collart et al. |
| 2012/0054278 A1 | 3/2012 | Taleb et al. |
| 2012/0059495 A1 | 3/2012 | Weiss et al. |
| 2012/0060046 A1 | 3/2012 | Millington |
| 2012/0071996 A1 | 3/2012 | Svendsen |
| 2012/0096526 A1 | 4/2012 | Brahmanapalli et al. |
| 2012/0117168 A1 | 5/2012 | Sugiyama et al. |
| 2012/0117185 A1 | 5/2012 | Cassidy |
| 2012/0117586 A1 | 5/2012 | Mccoy et al. |
| 2012/0124176 A1 | 5/2012 | Curtis et al. |
| 2012/0129446 A1 | 5/2012 | Ko et al. |
| 2012/0151320 A1 | 6/2012 | Mcclements, IV |
| 2012/0158531 A1 | 6/2012 | Dion et al. |
| 2012/0159393 A1 | 6/2012 | Sethi et al. |
| 2012/0206623 A1 | 8/2012 | Nakama |
| 2012/0210205 A1 | 8/2012 | Sherwood et al. |
| 2012/0221951 A1 | 8/2012 | Kidron |
| 2012/0233067 A1 | 9/2012 | Matthew et al. |
| 2012/0233639 A1 | 9/2012 | Zott et al. |
| 2012/0272156 A1 | 10/2012 | Kerger et al. |
| 2012/0284423 A1 | 11/2012 | Weel et al. |
| 2012/0311635 A1 | 12/2012 | Mushkatblat et al. |
| 2012/0315884 A1 | 12/2012 | Forutanpour et al. |
| 2012/0331386 A1 | 12/2012 | Hicken et al. |
| 2013/0007617 A1 | 1/2013 | Mackenzie et al. |
| 2013/0024880 A1 | 1/2013 | Moloney-Egnatios et al. |
| 2013/0031162 A1 | 1/2013 | Willis et al. |
| 2013/0061296 A1 | 3/2013 | Reddy et al. |
| 2013/0070093 A1 | 3/2013 | Rivera et al. |
| 2013/0073584 A1 | 3/2013 | Kuper et al. |
| 2013/0073979 A1 | 3/2013 | Shepherd et al. |
| 2013/0080599 A1 | 3/2013 | Ko et al. |
| 2013/0080955 A1 | 3/2013 | Reimann et al. |
| 2013/0081110 A1 | 3/2013 | Mcgowan |
| 2013/0128038 A1 | 5/2013 | Cok et al. |
| 2013/0129232 A1 | 5/2013 | Cok et al. |
| 2013/0130729 A1 | 5/2013 | Cok et al. |
| 2013/0159858 A1 | 6/2013 | Joffray et al. |
| 2013/0166649 A1 | 6/2013 | Atzmon et al. |
| 2013/0173531 A1 | 7/2013 | Rinearson et al. |
| 2013/0173794 A1 | 7/2013 | Agerbak et al. |
| 2013/0174204 A1 | 7/2013 | Coburn, IV et al. |
| 2013/0191454 A1 | 7/2013 | Oliver et al. |
| 2013/0198633 A1 | 8/2013 | Hyman |
| 2013/0221951 A1 | 8/2013 | Anderson et al. |
| 2013/0246522 A1 | 9/2013 | Bilinski et al. |
| 2013/0297686 A1 | 11/2013 | Bilinski et al. |

(56) References Cited

U.S. PATENT DOCUMENTS

| | | |
|---|---|---|
| 2013/0310316 A1 | 11/2013 | Hellstrom et al. |
| 2013/0339397 A1 | 12/2013 | Herasymchuk |
| 2013/0339589 A1 | 12/2013 | Qawami et al. |
| 2013/0343567 A1 | 12/2013 | Triplett et al. |
| 2013/0346859 A1 | 12/2013 | Bates et al. |
| 2014/0025688 A1 | 1/2014 | Andler et al. |
| 2014/0047074 A1 | 2/2014 | Chung et al. |
| 2014/0052770 A1 | 2/2014 | Gran et al. |
| 2014/0059431 A1 | 2/2014 | Svendsen et al. |
| 2014/0067998 A1 | 3/2014 | Garcia et al. |
| 2014/0075308 A1 | 3/2014 | Sanders et al. |
| 2014/0075316 A1 | 3/2014 | Li |
| 2014/0081796 A1 | 3/2014 | Cohen |
| 2014/0093219 A1 | 4/2014 | Trivedi |
| 2014/0108528 A1 | 4/2014 | Papakipos et al. |
| 2014/0115061 A1 | 4/2014 | Reddy et al. |
| 2014/0122590 A1 | 5/2014 | Svendsen et al. |
| 2014/0201632 A1 | 7/2014 | Kunigita et al. |
| 2014/0204076 A1 | 7/2014 | Kuper et al. |
| 2014/0208205 A1 | 7/2014 | Bartholomew |
| 2014/0223099 A1 | 8/2014 | Kidron |
| 2014/0237361 A1 | 8/2014 | Martin et al. |
| 2014/0244863 A1 | 8/2014 | Bradley et al. |
| 2014/0310058 A1 | 10/2014 | Aral et al. |
| 2014/0310779 A1 | 10/2014 | Lof et al. |
| 2014/0330951 A1 | 11/2014 | Sukoff et al. |
| 2014/0337959 A1 | 11/2014 | Garmark et al. |
| 2014/0341528 A1 | 11/2014 | Mahate et al. |
| 2014/0359680 A1 | 12/2014 | Shivadas et al. |
| 2015/0039620 A1 | 2/2015 | Ning |
| 2015/0046458 A1 | 2/2015 | Hu |
| 2015/0066892 A1 | 3/2015 | Astore |
| 2015/0067054 A1 | 3/2015 | Yoo et al. |
| 2015/0067871 A1 | 3/2015 | Commons et al. |
| 2015/0074534 A1 | 3/2015 | Didomenico et al. |
| 2015/0095680 A1 | 4/2015 | Gossain et al. |
| 2015/0113058 A1 | 4/2015 | Zhang et al. |
| 2015/0121220 A1 | 4/2015 | Lee et al. |
| 2015/0128162 A1 | 5/2015 | Ionescu et al. |
| 2015/0185599 A1 | 7/2015 | Mullins |
| 2015/0186110 A1 | 7/2015 | Kannan |
| 2015/0220498 A1 | 8/2015 | Munoz et al. |
| 2015/0286360 A1 | 10/2015 | Wachter |
| 2015/0331940 A1 | 11/2015 | Manning |
| 2016/0063011 A1 | 3/2016 | Wehbi et al. |
| 2016/0082348 A1 | 3/2016 | Kehoe et al. |
| 2016/0147501 A1 | 5/2016 | Gilbert |
| 2016/0180248 A1 | 6/2016 | Regan |
| 2016/0253145 A1 | 9/2016 | Lee et al. |
| 2017/0161119 A1 | 6/2017 | Boyle et al. |
| 2017/0169522 A1 | 6/2017 | Hyman et al. |
| 2017/0236512 A1 | 8/2017 | Williams et al. |

FOREIGN PATENT DOCUMENTS

| | | |
|---|---|---|
| CN | 102947827 A | 2/2013 |
| CN | 104126309 A | 10/2014 |
| EP | 0251584 A2 | 1/1988 |
| EP | 0672985 A1 | 9/1995 |
| EP | 1111527 A2 | 6/2001 |
| EP | 1389853 A1 | 2/2004 |
| JP | 2004354721 A | 12/2004 |
| JP | 2007520808 A | 7/2007 |
| JP | 2009540638 A | 11/2009 |
| JP | 2010141748 A | 6/2010 |
| JP | 2011128957 | 6/2011 |
| JP | 2011223124 A | 11/2011 |
| KR | 20010090215 | 10/2001 |
| KR | 20050051785 | 6/2005 |
| KR | 1020070040592 | 4/2007 |
| KR | 20070048922 | 5/2007 |
| KR | 100890993 | 3/2009 |
| KR | 20100060498 A | 6/2010 |
| KR | 20100071724 | 6/2010 |
| KR | 20100134164 | 12/2010 |
| KR | 20110064635 | 6/2011 |
| KR | 20130083012 A | 7/2013 |
| WO | 199525313 | 9/1995 |
| WO | 199961985 | 12/1999 |
| WO | 200147248 | 6/2001 |
| WO | 200153994 | 7/2001 |
| WO | 02052540 A1 | 7/2002 |
| WO | 2002052540 | 7/2002 |
| WO | 2003093950 A2 | 11/2003 |
| WO | 2005013047 A2 | 2/2005 |
| WO | 2005079071 A1 | 8/2005 |
| WO | 2007023120 A1 | 3/2007 |
| WO | 2010018429 A1 | 2/2010 |
| WO | 2011100264 A3 | 11/2011 |
| WO | 2011157891 A1 | 12/2011 |
| WO | 2012056326 A2 | 5/2012 |
| WO | 2012106269 | 8/2012 |
| WO | 2013139239 A1 | 9/2013 |
| WO | 2014004181 | 1/2014 |
| WO | 2014116693 A1 | 7/2014 |
| WO | 2014145746 | 9/2014 |

OTHER PUBLICATIONS

Advisory Action dated Feb. 3, 2017, issued in connection with U.S. Appl. No. 14/495,659, filed Sep. 24, 2014, 5 pages.
Advisory Action dated Sep. 11, 2019, issued in connection with U.S. Appl. No. 14/495,633, filed Sep. 24, 2014, 3 pages.
Advisory Action dated Jul. 12, 2016, issued in connection with U.S. Appl. No. 14/173,253, filed Feb. 5, 2014, 5 pages.
Advisory Action dated Mar. 19, 2019, issued in connection with U.S. Appl. No. 15/595,519, filed May 15, 2017, 3 pages.
Advisory Action dated Oct. 21, 2019, issued in connection with U.S. Appl. No. 15/664,634, filed Jul. 31, 2017, 4 pages.
Advisory Action dated Aug. 22, 2017, issued in connection with U.S. Appl. No. 14/173,253, filed Feb. 5, 2014, 4 pages.
Advisory Action dated Nov. 25, 2019, issued in connection with U.S. Appl. No. 15/607,267, filed May 26, 2017, 5 pages.
Advisory Action dated Oct. 25, 2019, issued in connection with U.S. Appl. No. 15/966,337, filed Apr. 30, 2018, 4 pages.
Advisory Action dated May 29, 2020, issued in connection with U.S. Appl. No. 15/595,519, filed May 15, 2017, 2 pages.
Akyildiz et al., "Multimedia Group Synchronization Protocols for Integrated Services Networks," IEEE Journal on Selected Areas in Communications, 1996 pp. 162-173, vol. 14, No. 1.
Anonymous: "Email Parser Tool—customizable email parsing software by ITG," May 17, 2014, [online] Retrieved from the Internet on Nov. 5, 2019: (URL:https//web.archive.org/web/20140517050139:// emailparser.net/).
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Benslimane Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International Conference on Multimedia Computing and Systems, 1996, pp. 372-381.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bretl W.E., et al., MPEG2 Tutorial [online], 2000 [retrieved on Jan. 13, 2009] Retrieved from the Internet:(http://www.bretl.com/mpeghtml/MPEGindex.htm), pp. 1-23.
Chinese Patent Office, First Office Action and Translation dated Feb. 2, 2019, issued in connection with Chinese Application No. 201580011640.5, 12 pages.
Chinese Patent Office, First Office Action dated Feb. 27, 2019, issued in connection with Chinese Application No. 201580007534.X, 9 pages.

(56) References Cited

OTHER PUBLICATIONS

Chinese Patent Office, First Office Action dated Sep. 4, 2017, issued in connection with Chinese Application No. 201480017214 8.0, 16 pages.
Chinese Patent Office, Second Office Action dated Apr. 11, 2018, issued in connection with Chinese Application No. 201480017214. 8, 7 pages.
Chinese Patent Office, Third Office Action dated Oct. 18, 2018, issued in connection with Chinese Application No. 2014800172148, 8 pages.
Corrected Notice of Allowability dated Jan. 19, 2017, issued in connection with U.S. Appl. No. 14/197,403, filed Mar. 5, 2014, 2 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse EP Application dated Oct. 16, 2018, issued in connection with European Application No. 157758970, 48 pages.
European Patent Office, Decision to Refuse EP Application dated Sep. 27, 2018, issued in connection with European Application No. 15781794.1, 54 pages.
European Patent Office, EP Supplemental Search dated Dec. 19, 2017, issued in connection with EP Application No. 15829058.5, 12 pages.
European Patent Office, European Extended Search Report dated Feb. 5, 2018, issued in connection with EP Application No. 15803430. 6, 8 pages.
European Patent Office, European Office Action dated Nov. 13, 2019, issued in connection with European Application No. 15829058. 5, 8 pages.
European Patent Office, European Office Action dated Jan. 2, 2019, issued in connection with European Application No. 15829058.5, 4 pages.
European Patent Office, European Office Action dated Aug. 3, 2017, issued in connection with EP Application No. 15781794.1, 6 pages.
European Patent Office, European Supplemental Search Report dated Sep. 18, 2017, issued in connection with EP Application No. 15829058.5, 13 pages.
European Patent Office, European Supplemental Search Report dated Jan. 27, 2016, issued in connection with European Application No. 14743335.3, 8 pages.
European Patent Office, Examination Report dated Feb. 3, 2017, issued in connection with European Patent Application No. 14743335. 3, 5 pages.
European Patent Office, Extended European Search Report dated Mar. 15, 2017, issued in connection with European Application No. 15758460.8, 9 pages.
European Patent Office, Extended European Search Report dated Dec. 23, 2016, issued in connection with European Application No. 15746781.2, 10 pages.
European Patent Office, Office Action dated Mar. 2, 2017, issued in connection with European Application No. 15775566.1, 7 pages.
European Patent Office, Office Action dated Apr. 4, 2017, issued in connection with European Application No. 15775897.0, 6 pages.
European Patent Office, Office Action dated Jan. 13, 2017, issued in connection with European Application No. 15781794.1, 8 pages.
European Patent Office, Office Action dated Mar. 13, 2017, issued in connection with European Application No. 15781200.9, 5 pages.
European Patent Office, Summons to Attend Oral Proceedings dated Jun. 11, 2019, issued in connection with European Application No. 14743335.3, 10 pages.
European Patent Office, Summons to Attend Oral Proceedings dated Mar. 27, 2018, issued in connection with European Patent Application No. 15781794.1, 11 pages.
Final Office Action dated Nov. 2, 2017, issued in connection with U.S. Appl. No. 14/275,112, filed May 12, 2014, 20 pages.
Final Office Action dated Oct. 2, 2019, issued in connection with U.S. Appl. No. 14/297,193, filed Jun. 5, 2014, 47 pages.
Final Office Action dated Nov. 3, 2016, issued in connection with U.S. Appl. No. 14/495,684, filed Sep. 24, 2014, 16 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
International Searching Authority, International Search Report and Written Opinion dated Apr. 24, 2015, issued in connection with International Application No. PCT/US2015/014156, filed on Feb. 3, 2015, 13 pages.
International Searching Authority, International Search Report and Written Opinion dated Aug. 27, 2015, issued in connection with International Application No. PCT/US2015/031934, filed on May 21, 2015, 14 pages.
International Searching Authority, International Search Report and Written Opinion dated Nov. 27, 2015, issued in connection with International Application No. PCT/US2015/044218, filed on Aug. 7, 2015, 13 pages.
International Searching Authority, International Search Report and Written Opinion dated May 29, 2015, issued in connection with International Application No. PCT/US2015/018850, filed on Mar. 5, 2015, 13 pages.
International Searching Authority, International Search Report dated May 8, 2014, issued in connection with International Application No. PCT/US2014/012534, filed on Jan. 24, 2014, 3 pages.
International Searching Authority, International Search Report dated Dec. 27, 2012, issued in connection with International Application No. PCT/US2012/047620, filed on Jul. 20, 2011, 3 pages.
International Searching Authority, Written Opinion dated Dec. 27, 2012, issued in connection with International Application No. PCT/US2012/047620, filed on Jul. 20, 2011, 5 pages.
International Searhing Authority, International Search Report and Written Opinion dated Feb. 28, 2013, issued in connection with International Application No. PCT/US2012/056467, filed on Sep. 21, 2012, 12 pages.
Ishibashi et al., "A Group Synchronization Mechanism for Live Media in Multicast Communications," IEEE Global Telecommunications Conference, 1997, pp. 746-752, vol. 2.
Ishibashi et al., "A Group Synchronization Mechanism for Stored Media in Multicast Communications," IEEE Information Revolution and Communications, 1997, pp. 692-700, vol. 2.
Japanese Patent Office, Full English Translation of Office Action dated Nov. 28, 2017, issued in connection with Japanese Patent Application No. 2016-555529, 2 pages.
Japanese Patent Office, Notice of Rejection dated Nov. 8, 2016, issued in connection with Japanese Application No. 2015-555237, 6 pages.
Japanese Patent Office, Office Action dated Nov. 28, 2017, issued in connection with Japanese Patent Application No. 2016-555529, 5 pages.
Japanese Patent Office, Office Action dated Nov. 7, 2017, issued in connection with Japanese Patent Application No. 2016-550231, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer Communication Review, 1994, pp. 28-43, vol. 24, No. 2.
Motorola, "Simplefi, Wireless Digital Audio Receiver, Installation and User Guide," Dec. 31, 2001, 111 pages.
Nilsson, M., "ID3 Tag Version 2," Mar. 26, 1998, 28 pages.

(56) References Cited

OTHER PUBLICATIONS

Non-Final Office Action dated Nov. 1, 2016, issued in connection with U.S. Appl. No. 14/173,253, filed Feb. 5, 2014, 21 pages.
Non-Final Office Action dated Oct. 1, 2015, issued in connection with U.S. Appl. No. 13/748,357, filed Jan. 23, 2013, 18 pages.
Non-Final Office Action dated Oct. 3, 2017, issued in connection with U.S. Appl. No. 14/495,633, filed Sep. 24, 2014, 18 pages.
Non-Final Office Action dated Apr. 6, 2016, issued in connection with U.S. Appl. No. 14/297,193, filed Jun. 5, 2014, 26 pages.
Non-Final Office Action dated May 6, 2015, issued in connection with U.S. Appl. No. 13/748,357, filed Jan. 23, 2013, 17 pages.
Non-Final Office Action dated Jul. 10, 2017, issued in connection with U.S. Appl. No. 14/297,193, filed Jun. 5, 2014, 33 pages.
Non-Final Office Action dated Sep. 10, 2015, issued in connection with U.S. Appl. No. 14/197,403, filed Mar. 5, 2014, 16 pages.
Non-Final Office Action dated Jan. 12, 2017, issued in connection with U.S. Appl. No. 14/275,112, filed May 12, 2014, 25 pages.
Non-Final Office Action dated May 12, 2020, issued in connection with U.S. Appl. No. 16/516,767, filed Jul. 19, 2019, 12 pages.
Non-Final Office Action dated Mar. 13, 2020, issued in connection with U.S. Appl. No. 15/664,634, filed Jul. 31, 2017, 20 pages.
Non-Final Office Action dated Nov. 13, 2018, issued in connection with U.S. Appl. No. 16/143,301, filed Sep. 26, 2018, 27 pages.
Non-Final Office Action dated Jan. 14, 2020, issued in connection with U.S. Appl. No. 15/966,337, filed Apr. 30, 2018, 16 pages.
Non-Final Office Action dated Jun. 14, 2017, issued in connection with U.S. Appl. No. 14/495,659, filed Sep. 24, 2014, 15 pages.
Non-Final Office Action dated Jan. 16, 2019, issued in connection with U.S. Appl. No. 15/664,634, filed Jul. 31, 2017, 17 pages.
Non-Final Office Action dated Dec. 17, 2015, issued in connection with U.S. Appl. No. 14/173,253, filed Feb. 5, 2014, 18 pages.
Non-Final Office Action dated Jun. 17, 2016, issued in connection with U.S. Appl. No. 14/495,706, filed Sep. 24, 2014, 19 pages.
Non-Final Office Action dated May 18, 2016, issued in connection with U.S. Appl. No. 14/197,403, filed Mar. 5, 2014, 21 pages.
Non-Final Office Action dated Feb. 19, 2019, issued in connection with U.S. Appl. No. 15/966,337, filed Apr. 30, 2018, 14 pages.
Non-Final Office Action dated Mar. 19, 2019, issued in connection with U.S. Appl. No. 15/607,267, filed May 26, 2017, 18 pages.
Non-Final Office Action dated Jun. 21, 2018, issued in connection with U.S. Appl. No. 15/692,090, filed Aug. 31, 2017, 20 pages.
Non-Final Office Action dated Jan. 22, 2019, issued in connection with U.S. Appl. No. 16/174,703, filed Oct. 30, 2018, 15 pages.
Non-Final Office Action dated Mar. 23, 2018, issued in connection with U.S. Appl. No. 15/227,074, filed Aug. 3, 2016, 11 pages.
Non-Final Office Action dated Jan. 24, 2018, issued in connection with U.S. Appl. No. 15/607,267, filed May 26, 2017, 17 pages.
Non-Final Office Action dated Dec. 27, 2018, issued in connection with U.S. Appl. No. 14/297,193, filed Jun. 5, 2014, 37 pages.
Non-Final Office Action dated Apr. 28, 2020, issued in connection with U.S. Appl. No. 14/297,193, filed Jun. 5, 2014, 34 pages.
Non-Final Office Action dated Nov. 28, 2017, issued in connection with U.S. Appl. No. 14/821,513, filed Aug. 7, 2015, 17 pages.
Non-Final Office Action dated Jul. 31, 2019, issued in connection with U.S. Appl. No. 15/595,519, filed May 15, 2017, 14 pages.
Non-Final Office Action dated Apr. 4, 2019, issued in connection with U.S. Appl. No. 15/612,126, filed Jun. 2, 2017, 9 pages.
Non-Final Office Action dated Dec. 6, 2018, issued in connection with U.S. Appl. No. 14/495,633, filed Sep. 24, 2014, 15 pages.
Final Office Action dated Oct. 3, 2019, issued in connection with U.S. Appl. No. 16/174,703, filed Oct. 30, 2018, 17 pages.
Final Office Action dated Apr. 6, 2016, issued in connection with U.S. Appl. No. 14/173,253, filed Feb. 5, 2014, 20 pages.
Final Office Action dated Feb. 7, 2017, issued in connection with U.S. Appl. No. 14/455,651, filed Aug. 8, 2014, 22 pages.
Final Office Action dated Oct. 7, 2016, issued in connection with U.S. Appl. No. 14/495,595, filed Sep. 24, 2014, 16 pages.
Final Office Action dated Nov. 8, 2016, issued in connection with U.S. Appl. No. 14/495,659, filed Sep. 24, 2014, 14 pages.
Final Office Action dated Feb. 10, 2016, issued in connection with U.S. Appl. No. 14/197,403, filed Mar. 5, 2014, 21 pages.
Final Office Action dated Feb. 11, 2020, issued in connection with U.S. Appl. No. 15/595,519, filed May 15, 2017, 15 pages.
Final Office Action dated Feb. 16, 2017, issued in connection with U.S. Appl. No. 14/495,633, filed Sep. 24, 2014, 15 pages.
Final Office Action dated Sep. 16, 2016, issued in connection with U.S. Appl. No. 14/275,112, filed May 12, 2014, 19 pages.
Final Office Action dated Jan. 19, 2018, issued in connection with U.S. Appl. No. 14/297,193, filed Jun. 5, 2014, 32 pages.
Final Office Action dated Jan. 2, 2019, issued in connection with U.S. Appl. No. 15/595,519, filed May 15, 2017, 14 pages.
Final Office Action dated Aug. 20, 2019, issued in connection with U.S. Appl. No. 15/607,267, filed May 26, 2017, 19 pages.
Final Office Action dated Oct. 20, 2016, issued in connection with U.S. Appl. No. 14/197,403, filed Mar. 5, 2016, 17 pages.
Final Office Action dated Mar. 28, 2018, issued in connection with U.S. Appl. No. 14/495,633, filed Sep. 24, 2014, 21 pages.
Final Office Action dated Oct. 29, 2018, issued in connection with U.S. Appl. No. 15/607,267, filed May 26, 2017, 17 pages.
Final Office Action dated Sep. 30, 2016, issued in connection with U.S. Appl. No. 14/297,193, filed Jun. 5, 2014, 34 pages.
Final Office Action dated Jul. 31, 2019, issued in connection with U.S. Appl. No. 15/664,634, filed Jul. 31, 2017, 16 pages.
Final Office Action dated May 31, 2017, issued in connection with U.S. Appl. No. 14/173,253, filed Feb. 5, 2014, 22 pages.
Final Office Action dated May 31, 2017, issued in connection with U.S. Appl. No. 14/821,513, filed Aug. 7, 2015, 16 pages.
Final Office Action dated Jul. 5, 2019, issued in connection with U.S. Appl. No. 14/495,633, filed Sep. 24, 2014, 16 pages.
Final Office Action dated Jul. 5, 2019, issued in connection with U.S. Appl. No. 15/966,337, filed Apr. 30, 2018, 16 pages.
First Action Interview Office Action dated Apr. 4, 2016, issued in connection with U.S. Appl. No. 14/275,112, filed May 12, 2014, 8 pages.
First Action Interview Office Action dated Jul. 7, 2016, issued in connection with U.S. Appl. No. 14/495,595, filed Sep. 24, 2014, 6 pages.
First Action Interview Office Action dated Jul. 11, 2016, issued in connection with U.S. Appl. No. 14/495,684, filed Sep. 24, 2014, 8 pages.
First Action Interview Office Action dated Jul. 13, 2016, issued in connection with U.S. Appl. No. 14/455,651, filed Aug. 8, 2014, 10 pages.
First Action Interview Office Action dated Oct. 13, 2016, issued in connection with U.S. Appl. No. 14/495,633, filed Sep. 24, 2014, 8 pages.
First Action Interview Office Action dated Dec. 14, 2016, issued in connection with U.S. Appl. No. 14/821,513, filed Aug. 7, 2015, 10 pages.
First Action Interview Office Action dated Nov. 14, 2019, issued in connection with U.S. Appl. No. 16/188,186, filed Nov. 12, 2018, 14 pages.
First Action Interview Office Action dated Jan. 17, 2020, issued in connection with U.S. Appl. No. 16/188,186, filed Nov. 12, 2018, 14 pages .
First Action Interview Office Action dated Jul. 22, 2016, issued in connection with U.S. Appl. No. 14/495,659, filed Sep. 24, 2014, 8 pages.
First Action Interview Pilot Program Pre-Interview Communication dated Oct. 28, 2015, issued in connection with U.S. Appl. No. 14/275,112, filed May 12, 2014, 4 pages.
First Action Interview Pilot Program Pre-Interview Communication dated Apr. 3, 2017, issued in connection with U.S. Appl. No. 14/495,590, filed Sep. 24, 2014, 5 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Bureau, International Preliminary Report on Patentability dated Jan. 30, 2014, issued in connection with International Application No. PCT/US2012/047620, filed on Jul. 20, 2012, 7 pages.

(56) References Cited

OTHER PUBLICATIONS

International Bureau, International Preliminary Report on Patentability dated Apr. 3, 2014, issued in connection with International Application No. PCT/US2012/056467, filed on Sep. 21, 2011, 11 pages.
International Bureau, International Preliminary Report on Patentability, dated Aug. 6, 2015, issued in connection with International Application No. PCT/US2014/012534, filed on Jan. 22, 2014, 6 pages.
International Bureau, International Preliminary Report on Patentability dated Dec. 15, 2016, issued in connection with International Application No. PCT/US2015/031934, filed on May 21, 2015, 11 pages.
International Bureau, International Preliminary Report on Patentability dated Aug. 18, 2016, issued in connection with International Application No. PCT/US2015/014156, filed on Feb. 3, 2015, 10 pages.
International Bureau,International Preliminary Report on Patentability dated Sep. 15, 2016, issued in connection with International Application No. PCT/US2015/018850, filed on Mar. 5, 2015, 10 pages.
International Searching Authority, International Preliminary Report on Patentability dated Apr. 6, 2017, issued in connection with International Application No. PCT/US2015/051968 filed on Sep. 24, 2015, 10 pages.
International Searching Authority, International Preliminary Report on Patentability dated Apr. 6, 2017, issued in connection with International Application No. PCT/US2015/051975 filed on Sep. 24, 2015, 9 pages.
International Searching Authority, International Preliminary Report on Patentability dated Apr. 6, 2017, issued in connection with International Application No. PCT/US2015/051983 filed on Sep. 24, 2015, 7 pages.
International Searching Authority, International Preliminary Report on Patentability dated Apr. 6, 2017, issued in connection with International Application No. PCT/US2015/051989 filed on Sep. 24, 2015, 7 pages.
International Searching Authority, International Preliminary Report on Patentability dated Apr. 6, 2017, issued in connection with International Application No. PCT/US2015/051993 filed on Sep. 24, 2015, 8 pages.
International Searching Authority, International Preliminary Report on Patentability dated Feb. 23, 2017, issued in connection with International Application No. PCT/US2015/044218, filed on Aug. 7, 2015, 10 pages.
International Searching Authority, International Search Report and Written Opinion dated Nov. 6, 2015, issued in connection with International Application No. PCT/US2015/051993, filed on Sep. 24, 2015, 10 pages.
International Searching Authority, International Search Report and Written Opinion dated Dec. 7, 2015, issued in connection with International Application No. PCT/US2015/051968, filed on Sep. 24, 2015, 14 pages.
International Searching Authority, International Search Report and Written Opinion dated Dec. 16, 2015, issued in connection with International Application No. PCT/US2015/051989 filed on Sep. 24, 2015, 11 pages.
International Searching Authority, International Search Report and Written Opinion dated Dec. 21, 2015, issued in connection with International Application No. PCT/US2015/051983 filed on Sep. 24, 2015, 11 pages.
International Searching Authority, International Search Report and Written Opinion dated Nov. 23, 2015, issued in connection with International Application No. PCT/US2015/051975, filed on Sep. 24, 2015, 14 pages.
North American MPEG-2 Information, "The MPEG-2 Transport Stream," Retrieved from the Internet: URL: http://www.coolstf.com/mpeg/#ts, 2006, pp. 1-5.
Notice of Allowance dated May 4, 2016, issued in connection with U.S. Appl. No. 13/748,357, filed Jan. 23, 2013, 11 pages.
Notice of Allowance dated Apr. 6, 2017, issued in connection with U.S. Appl. No. 14/197,403, filed Mar. 5, 2014, 5 pages.
Notice of Allowance dated Apr. 10, 2020, issued in connection with U.S. Appl. No. 16/188,186, filed Nov. 12, 2018, 10 pages.
Notice of Allowance dated Feb. 11, 2019, issued in connection with U.S. Appl. No. 15/692,090, filed Aug. 31, 2017, 8 pages.
Notice of Allowance dated Feb. 11, 2019, issued in connection with U.S. Appl. No. 16/143,301, filed Sep. 26, 2018, 15 pages.
Notice of Allowance dated Jan. 12, 2017, issued in connection with U.S. Appl. No. 14/495,595, filed Sep. 24, 2014, 5 pages.
Notice of Allowance dated Dec. 17, 2019, issued in connection with U.S. Appl. No. 16/174,703, filed Oct. 30, 2018, 11 pages.
Notice of Allowance dated Jan. 17, 2020, issued in connection with U.S. Appl. No. 15/612,126, filed Jun. 2, 2017, 5 pages.
Notice of Allowance dated Jul. 18, 2018, issued in connection with U.S. Appl. No. 15/227,074, filed Aug. 3, 2016, 8 pages.
Notice of Allowance dated Sep. 19, 2017, issued in connection with U.S. Appl. No. 14/455,651, filed Aug. 8, 2014, 12 pages.
Notice of Allowance dated Aug. 24, 2017, issued in connection with U.S. Appl. No. 14/495,590, filed Sep. 24, 2014, 10 pages.
Notice of Allowance dated Jan. 26, 2017, issued in connection with U.S. Appl. No. 14/495,706, filed Sep. 24, 2014, 8 pages.
Notice of Allowance dated Dec. 27, 2017, issued in connection with U.S. Appl. No. 14/495,659, filed Sep. 24, 2014, 6 pages.
Notice of Allowance dated Dec. 27, 2019, issued in connection with U.S. Appl. No. 14/495,633, filed Sep. 24, 2014, 7 pages.
Notice of Allowance dated Apr. 28, 2020, issued in connection with U.S. Appl. No. 15/612,126, filed Jun. 2, 2017, 5 pages.
Notice of Allowance dated Dec. 29, 2016, issued in connection with U.S. Appl. No. 14/197,403, filed Mar. 5, 2014, 5 pages.
Notice of Allowance dated Aug. 30, 2018, issued in connection with U.S. Appl. No. 14/821,513, filed Aug. 7, 2015, 10 pages.
Notice of Allowance dated Oct. 30, 2019, issued in connection with U.S. Appl. No. 16/458,453, filed Jul. 1, 2019, 7 pages.
Notice of Allowance dated May 31, 2017, issued in connection with U.S. Appl. No. 14/495,684, filed Sep. 24, 2014, 5 pages.
Notice of Allowance dated May 4, 2017, issued in connection with U.S. Appl. No. 14/495,595, filed Sep. 24, 2014, 5 pages.
Notice of Allowance dated Aug. 5, 2019, issued in connection with U.S. Appl. No. 15/612,126, filed Jun. 2, 2017, 5 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Polycom Conference Composer User Guide, copyright 2001, 29 pages.
Pre-Brief Conference Decision mailed on Sep. 7, 2018, issued in connection with U.S. Appl. No. 14/297,193, filed Jun. 5, 2014, 2 pages.
Preinterview First Office Action dated May 4, 2016, issued in connection with U.S. Appl. No. 14/455,651, filed Aug. 8, 2014, 7 pages.
Preinterview First Office Action dated May 4, 2016, issued in connection with U.S. Appl. No. 14/495,659, filed Sep. 24, 2014, 6 pages.
Preinterview First Office Action dated May 5, 2016, issued in connection with U.S. Appl. No. 14/495,595, filed Sep. 24, 2014, 6 pages.
Preinterview First Office Action dated May 16, 2016, issued in connection with U.S. Appl. No. 14/495,633, filed Sep. 24, 2014, 6 pages.
Preinterview First Office Action dated Oct. 19, 2016, issued in connection with U.S. Appl. No. 14/821,513, filed Aug. 7, 2016, 5 pages.
Preinterview First Office Action dated May 23, 2016, issued in connection with U.S. Appl. No. 14/495,684, filed Sep. 24, 2014, 6 pages.
Presentations at WinHEC 2000, May 2000, 138 pages.
PRISMIQ, Inc., "PRISMIQ Media Player User Guide," 2003, 44 pages.

(56) References Cited

OTHER PUBLICATIONS

Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. 12/070,933, filed Feb. 22, 2008. "System, Method, and Computer Program for Remotely Managing a Digital Device" Inventor: Jonathan Lang, et al.
U.S. Appl. No. 13/533,105, filed Jun. 26, 2012. "Systems, Methods, Apparatus, and Articles of Manufacture to Provide a Crowd-Sourced Playlist with Guess Access" Inventor: Paul Bates, et al.
U.S. Appl. No. 13/533,785, filed Jun. 26, 2012. "Networked Music Playback Including Remote Discovery and Add to Queue" Inventor: Mark Triplett, et al.
U.S. Appl. No. 13/748,357, filed Jan. 23, 2013. "System and Method for a Media Experience Social Interface" Inventor: Ron Kuper, et al.
U.S. Appl. No. 13/871,785, filed Apr. 26, 2013. "Systems, Methods, Apparatus, and Articles of Manufacture to Provide Guest Access" Inventor: Paul Bates, et al.
U.S. Appl. No. 13/871,795, filed Jun. 20, 2013. "Systems, Methods, Apparatus, and Articles of Manufacture to Provide Guest Access" Inventor: Paul Bates, et al.
U.S. Appl. No. 14/173,253, filed Feb. 5, 2014. "Remote Creation of a Playback Queue for a Future Event" Inventor: Jaime Munoz, et al.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 32 manual: copyright 2001.
Yamaha DME 64 Owner's Manual; copyright 2004, 80 pages.

\* cited by examiner

SHARE RESTRICTION FOR CURATED PLAYLISTS

CROSS REFERENCE TO RELATED APPLICATIONS

This application claims priority under 35 U.S.C. § 120 to, and is a continuation of, U.S. non-provisional Patent application Ser. No. 16/174,703, filed on Oct. 30, 2018 entitled "Share Restriction for Curated Playlists," which is incorporated herein by reference in its entirety.

U.S. non-provisional patent application Ser. No. 16/174,703 claims priority under 35 U.S.C. § 120 to, and is a continuation of, U.S. non-provisional patent application Ser. No. 14/275,112, filed on May 12, 2014 entitled "Share Restriction for Media Items," which is incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
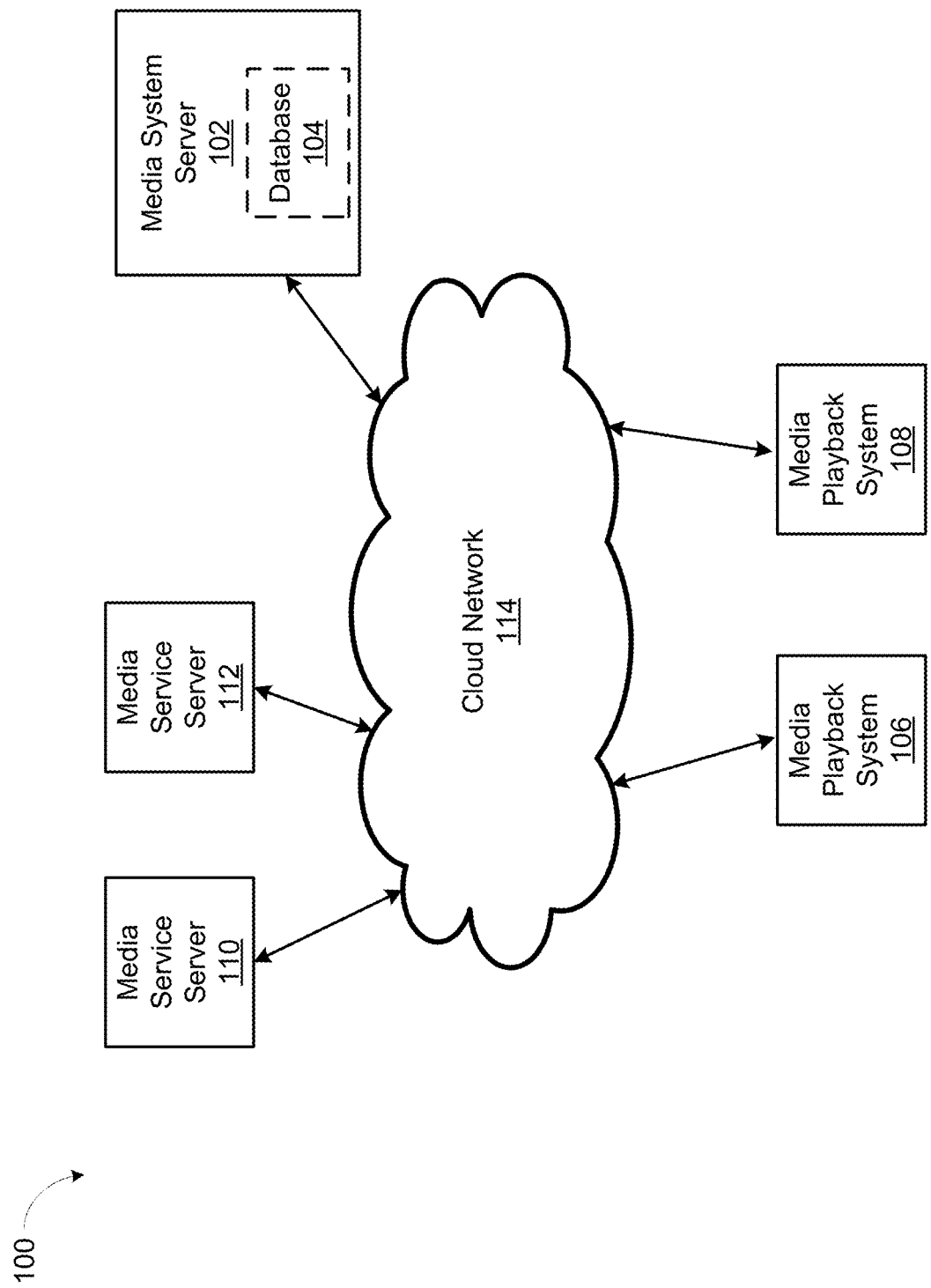
FIG. 1 shows an example network configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Media services (e.g., Pandora® Radio, Spotify®, Slacker® Radio, Google Play™, iTunes Radio™, and others) are a popular source of media for playback on playback devices. Some media services may provide to their subscribers various sets of media items for addition to a "playback queue," where the media items added to the playback queue may eventually be played back by a playback device. Such a set of media items may include particular media items in a particular order. In some instances, the set of media items and/or the particular order of the media items may be established by the media service itself, by one or more users of the media service, and/or by a third-party "curator" service, among other examples. For purposes of example and explanation herein, such a set of media items in a particular order may be referred to as a "playlist."

In some implementations, it may be possible to share playback queues between playback devices and/or playback systems (i.e., systems of playback devices) via one or more networks. According to examples described herein, in a networked media playback configuration where a first user may share with a second user a playback queue that includes media items representative of a playlist, it may be desirable to apply a share restriction on some or all of the media items included in the playback queue. Such a share restriction may be used to limit access by the second user to some or all of the media items.

To enable sharing of playback queues in some instances, a network may communicatively couple a first and second media playback system, a first and second media service, and/or a media system server. In some implementations, the media system server may facilitate sharing media items between the media playback systems.

The media system server (or another suitable networked device) may be capable of "cross-service linking" shared media content. Cross-service linking may involve the media system server receiving from the first media playback system a share request that identifies a first media item that a first user would like to share with a second user of the second media playback system. The share request may also include an identifier of the to-be-shared media item that is unique to the first media service. When the second user does not have access to the first media item (e.g., because the second user does not have a subscription to the first media service), the media playback system may utilize a cross-service linking database to identify an associated media item provided by the second media service, where the second user does have a subscription to the second media service. Two media items may be associated when they include comparable underlying media content. The media playback system may then transmit to the second media playback system an identifier of the associated media item and thereby facilitate access of shared media content using the cross-service linking.

Nonetheless, cross-service linking may not be desirable in some instances. For example, as noted above, some media services and/or third-party curator services provide their subscribers media items representative of a playlist. A media service, subscriber to a media service, or a curator may have created a given set of media items representative of a playlist. Such a set of media items may include particular media items in a particular order based on the creator's preferences. As such, a given playlist may be proprietary to the source (e.g., creator) of the playlist. Accordingly, when a first user attempts to share with a second user a playback queue that includes media items representative of such a proprietary playlist, it may be undesirable for the media playback system to perform cross-service linking when the second user does not have a subscription with the creator of the playlist and/or does not have access to the media service that provides the media items that make up the playlist. It may generally be undesirable to allow unfettered sharing of playback queues for other reasons as well.

To help address this issue, when a first user attempts to share a playback queue that includes a plurality of media items representative of a proprietary playlist, a computing device (e.g., a playback device or control device) or a computing system (e.g., a cloud server) may determine one or more characteristics of the plurality of media items. One such characteristic may indicate a source of the plurality of media items (e.g., the media service and/or curator, among other examples). Based on the determined characteristics of the plurality of media items, the computing device or system may assign to the plurality of media items a share restriction, for example, because the plurality of media items is proprietary. The share restriction may limit access to the plurality of media items by a second computing device that is not associated with a subscription to the source of the plurality of media items.

The second computing device may then receive an indication of the share restriction and perhaps an indication of the playback queue that includes an indication of the plurality of media items. Thereafter, the second computing device may determine from the share restriction that the second computing device does not have access to the plurality of media items. Consequently, the second computing device may have limited or no playback ability with respect to plurality of the media items.

The second computing device may also be limited in other ways. As one example, the second computing device may be limited as to the extent to which a representation of the plurality of media items is displayed to the second user. For instance, the plurality of media items may be displayed such that it is grayed out and the media items are not selectable, or perhaps the plurality of media items may be replaced by an indication of where the user may obtain access to the plurality of media items. Other examples are also possible.

As indicated above, examples provided herein relate to a share restriction on a plurality of media items that is part of a playback queue. In one aspect, a method is provided. The method involves (a) receiving by a first computing device input data indicating an instruction to share a playback queue, wherein the playback queue comprises a plurality of media items, (b) determining one or more characteristics of the plurality of media items, wherein at least one of the one or more characteristics indicates a source of the plurality of media items, (c) based on the determined one or more characteristics of the plurality of media items, assigning to the plurality of media items a share restriction that limits access to the plurality of media items, and (d) transmitting to a second computing device an indication of the share restriction assigned to the plurality of media items.

In another aspect, a non-transitory computer-readable medium is provided. The non-transitory computer-readable medium having instructions stored thereon that are executable by a first computing device to cause the first computing device to perform functions, the functions include (a) receiving input data indicating an instruction to share a playback queue, wherein the playback queue comprises a plurality of media items, (b) determining one or more characteristics of the plurality of media items, wherein at least one of the one or more characteristics indicates a source of the plurality of media items, (c) based on the determined one or more characteristics of the plurality of media items, assigning to the plurality of media items a share restriction that limits access to the plurality of media items, and (d) transmitting to a second computing device an indication of the share restriction assigned to the plurality of media items.

In an example aspect, a method is provided. The method involves (a) receiving by a computing system from a first computing device an instruction to share a playback queue, wherein the playback queue comprises a plurality of media items, (b) determining one or more characteristics of the plurality of media items, wherein at least one of the one or more characteristics indicates a source of the plurality of media items, (c) based on the determined one or more characteristics of the plurality of media items, assigning to the plurality of media items a share restriction that limits access to the plurality of media items, and (d) transmitting to a second computing device an indication of the share restriction assigned to the plurality of media items.

In yet another example aspect, another method is provided. The method involves (a) receiving by a computing device (i) an indication of a shared playback queue, wherein the indication of the shared playback queue includes at least an indication of a plurality of media items and an indication of one or more additional media items, and (ii) an indication of a share restriction assigned to the plurality of media items, (b) based on the share restriction, determining that the computing device does not have access to a source of the plurality of media items, and (c) based at least on the determination that the computing device does not have access to the source of the plurality of media items, playing the shared playback queue in accordance with the share restriction.

In one other example aspect, an additional method is provided. The method involves (a) receiving by a computing device (i) an indication of a shared playback queue, wherein the indication of the shared playback queue includes at least an indication of a plurality of media items and an indication of one or more additional media items, and (ii) an indication of a share restriction assigned to the plurality of media items, (b) based on the share restriction, determining that the computing device does not have access to a source of the plurality of media items, and (c) based at least on the determination that the computing device does not have access to the source of the plurality of media items, causing a graphical display to display a representation of the plurality of media items in accordance with the share restriction.

It will be understood by one of ordinary skill in the art that this disclosure includes numerous other embodiments.

II. Example Network Configuration

FIG. 1 shows an example network configuration 100 in which one or more embodiments disclosed herein may be practiced or implemented. As shown, the network configuration 100 may include a media system server 102, two or more media playback systems 106 and 108, two or more media service servers 110 and 112, and a cloud network 114. In some examples, the media system server 102 may include a database 104. In other examples, the database 104 may be located on a different network element, perhaps one that is not shown. Accordingly, it should be understood that the network configuration 100 may include additional network elements as well.

The cloud network 114 may communicatively couple the various network elements of the network configuration 100. In such an arrangement, the media system server 102 may communicate with the media playback systems 106-108 and/or the media service servers 110-112 via the cloud network 114. Similarly, the media playback systems 106-108 may communicate with the media service servers 110-112 via the cloud network 114. Further, the media playback systems 106-108 may communicate with one another via the cloud network 114. The cloud network 114 may be, for example, a wide-area network (WAN). As such, the cloud network 114 may include the Internet and/or one or more cellular networks, among other networks.

Generally speaking, a media playback system 106-108 may be any type of media playback system configured to receive and transmit data over a data network and playback media items. Each of the media playback systems 106-108 may be physically located in different locations. Alternatively, the media playback systems 106-108 may be physically located in the same location (e.g., an office building). In practice, a media playback system 106-108 may include one or more playback devices. Such a media playback system is discussed in further detail below with reference to example media playback system 200.

A media service server 110-112 may include at least one processor, data storage, and a network interface, among other components. A media service server 110-112 may be configured to store media items (e.g., a media library) and/or access such media items to transmit to a playback device. A media service server 110-112 may also create or obtain metadata related to the media items, as well as store such metadata.

In practice, the media service servers 110-112 may provide media content to the media playback systems 106-108. In particular, each media service may provide streaming media and/or media downloads, among other examples. Each media service server may provide "Internet radio" service and/or "on-demand" service (e.g., where a user may request a particular media item) to one or both of the media playback systems 106-108. When a media service server 110-112 provides a media item to a media playback system, the media service server may provide metadata along with the media item.

The media system server 102 may include a network interface, a processing unit, and data storage, all of which may be communicatively linked together by a system bus, network, or other connection mechanism. The network interface may facilitate data flow between the media system server 102 and other network elements on the cloud network 114. The processing unit may include one or more general purpose processors and/or one or more special purpose processors and may be integrated in whole or in part with the network interface. The data storage may include a non-transitory computer-readable medium, such as optical, magnetic, or flash memory, and may be integrated in whole or in part with the processing unit. The data storage may then include program instructions that are executable by the processing unit to carry out various functions described herein.

In example implementations, the data storage may also include the database 104 that may contain data related to media items. The data may be stored in the form of a table or the like. In some implementations, the database 104 may include data that may be used by the media system server 102 to perform cross-service linking functions. Accordingly, the database 104 may be referred to herein as a "cross-service linking database." In other examples, the media system server 102 may utilize an external database or the like to perform cross-service linking.

In general, cross-service linking involves the media system server 102 receiving a first media-item identifier of a first service provider and outputting a second media-item identifier of a second service provider, where the first media-item identifier and the second media-item identifier identify substantially the same underlying media content. In practice, each media service server 110-112 may maintain a respective database that includes media provided by the respective media service. And typically, each respective database may be maintained in a unique manner. As such, without using the cross-service linking database 104, information used to retrieve media from the media service server 110 may not be useful for retrieving media from the media service server 112. Accordingly, the cross-service linking database 104 may facilitate accessing media from a given media service (e.g., the media service server 112) using information related to a different media service (e.g., the media service server 110).

In example implementations, the media system server 102 may be configured to maintain the cross-service linking database 104, which may involve a number of functions. For example, the media system server 102 may receive a first message from the media playback system 106. For instance, after or while the media playback system 106 plays a first media item, the media playback system 106 may transmit the first message to the media system server 102. The first message may identify a first service (e.g., service provided by the media service server 110) used by the media playback system 106 to obtain the first media item for playback. The first message may also include a first service media-item identifier that the media service server 110 uses to identify the first media item. Further, the first message may include a first metadata that is associated with the first media item (e.g., a track title, artist name, album title, etc.). The media system server 102 may store some or all of this first message information in the cross-service linking database 104.

The media system server 102 may thereafter receive a second message from the media playback system 108. As with the first message, the second message may identify a second service (e.g., service provided by the media service server 112) used by the media playback system 108 to obtain a second media item for playback, a second service media-item identifier used to identify the second media item, and a second metadata that is associated with the second media item. The media system server 102 may store some or all of this second message information in the database 104.

The media system server 102 may then compare the second metadata with the first metadata that was previously stored in the database 104 to determine if, and to what extent, the first metadata and the second metadata have any similarities. If the media system server 102 determines that the second metadata and the first metadata are substantially similar, the media system server 102 may infer that the first media item and the second media item have comparable underlying media content. In response, the media system server 102 may store association data in the database 104 indicating that the first service media-item identifier and the second service media-item identifier identify media items that include the same content.

As a result of such an association, the media system server 102 may use the cross-service linking database 104 to retrieve the second service media-item identifier using the first service media-item identifier and vice versa. In practice, the media system server 102 may perform cross-service linking for a plurality of media items. In this way, a user who does not have access to a first service but does have access to a second service may still obtain desired media content from the second service using media-item information of the first service.

In some implementations, some or all of the cross-service linking functions described above may be carried out by any other suitable network element. Furthermore, in example implementations, one network element (e.g., the media system server 102) may perform cross-service linking functions to build the cross-service linking database, and then another network element (e.g., a computing device of either of the media playback systems 106, 108) may locally store and/or reference the cross-service linking database.

III. Example Media Playback System

Figure 2:
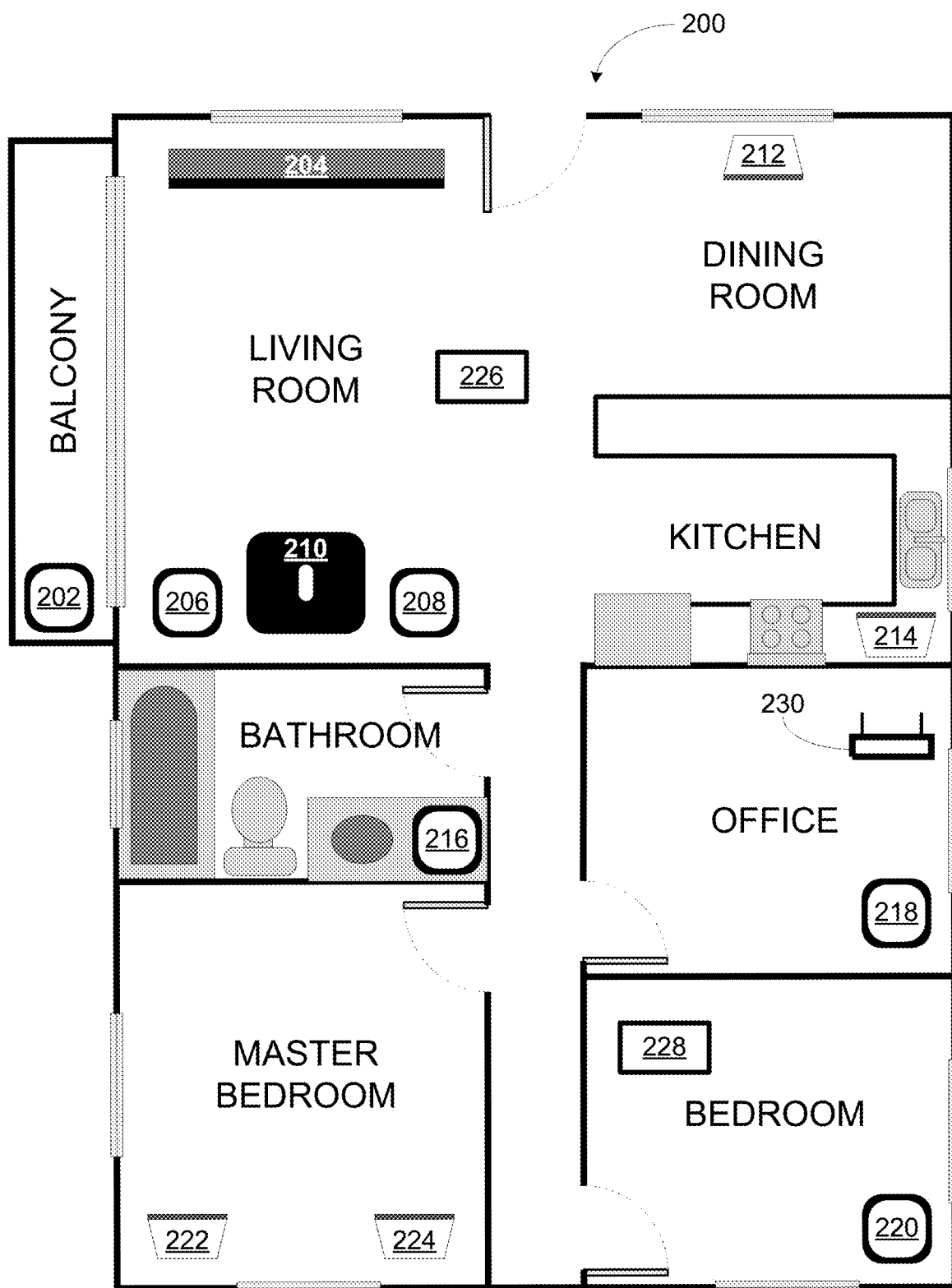
FIG. 2 shows an example media playback system configuration.

FIG. 2 shows an example configuration of a media playback system 200. The media playback system 200 as shown is associated with an example home environment having several rooms and spaces, such as for example, a master bedroom, an office, a dining room, and a living room. As shown in the example of FIG. 2, the media playback system 200 includes playback devices 202-224, control devices 226 and 228, and a wired or wireless network router 230.

Further discussions relating to the different components of the example media playback system 200 and how the different components may interact to provide a user with a media experience may be found in the following sections. While discussions herein may generally refer to the example media playback system 200, technologies described herein are not limited to applications within, among other things, the home environment as shown in FIG. 2. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 3:
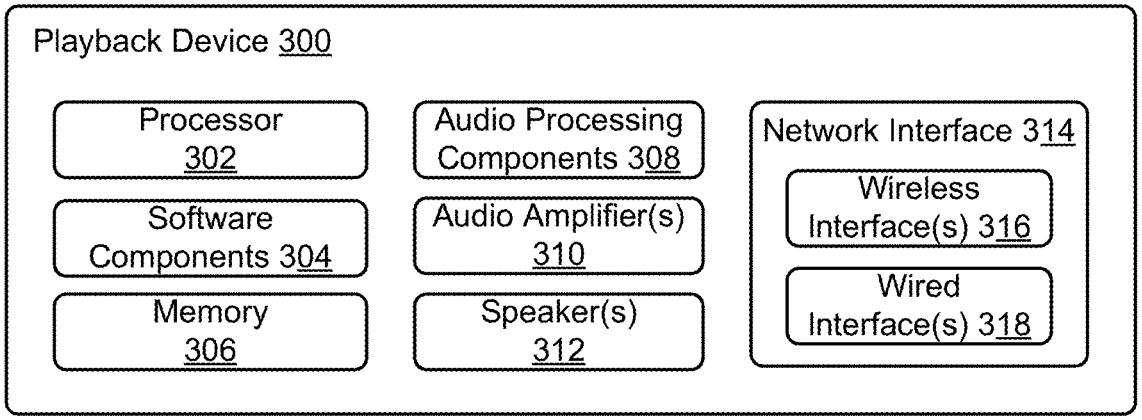
FIG. 3 shows a functional block diagram of an example playback device.

FIG. 3 shows a functional block diagram of an example playback device 300 that may be configured to be one or more of the playback devices 202-224 of the media playback system 200 of FIG. 2. The playback device 300 may include a processor 302, software components 304, memory 306, audio processing components 308, audio amplifier(s) 310, speaker(s) 312, and a network interface 314 including wireless interface(s) 316 and wired interface(s) 318. In one case, the playback device 300 may not include the speaker(s) 312, but rather a speaker interface for connecting the playback device 300 to external speakers. In another case, the playback device 300 may include neither the speaker(s) 312 nor the audio amplifier(s) 310, but rather an audio interface for connecting the playback device 300 to an external audio amplifier or audio-visual receiver.

In one example, the processor 302 may be a clock-driven computing component configured to process input data according to instructions stored in the memory 306. The memory 306 may be a tangible computer-readable medium configured to store instructions executable by the processor 302. For instance, the memory 306 may be data storage that can be loaded with one or more of the software components 304 executable by the processor 302 to achieve certain functions. In one example, the functions may involve the playback device 300 retrieving audio data from an audio source or another playback device. In another example, the functions may involve the playback device 300 sending audio data to another device or playback device on a network. In yet another example, the functions may involve pairing of the playback device 300 with one or more playback devices to create a multi-channel audio environment.

Certain functions may involve the playback device 300 synchronizing playback of audio content with one or more other playback devices. During synchronous playback, a listener will preferably not be able to perceive time-delay differences between playback of the audio content by the playback device 300 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 306 may further be configured to store data associated with the playback device 300, such as one or more zones and/or zone groups the playback device 300 is a part of, audio sources accessible by the playback device 300, or a playback queue that the playback device 300 (or some other playback device) may be associated with. The data may be stored as one or more state variables that are periodically updated and used to describe the state of the playback device 300. The memory 306 may also include the data associated with the state of the other devices of the media system, and shared from time to time among the devices so that one or more of the devices have the most recent data associated with the system. Other embodiments are also possible.

The audio processing components 308 may include one or more digital-to-analog converters (DAC), an audio preprocessing component, an audio enhancement component or a digital signal processor (DSP), and so on. In one embodiment, one or more of the audio processing components 308 may be a subcomponent of the processor 302. In one example, audio content may be processed and/or intentionally altered by the audio processing components 308 to produce audio signals. The produced audio signals may then be provided to the audio amplifier(s) 310 for amplification and playback through speaker(s) 312. Particularly, the audio amplifier(s) 310 may include devices configured to amplify audio signals to a level for driving one or more of the speakers 312. The speaker(s) 312 may include an individual transducer (e.g., a "driver") or a complete speaker system involving an enclosure with one or more drivers. A particular driver of the speaker(s) 312 may include, for example, a subwoofer (e.g., for low frequencies), a mid-range driver (e.g., for middle frequencies), and/or a tweeter (e.g., for high frequencies). In some cases, each transducer in the one or more speakers 312 may be driven by an individual corresponding audio amplifier of the audio amplifier(s) 310. In addition to producing analog signals for playback by the playback device 300, the audio processing components 308 may be configured to process audio content to be sent to one or more other playback devices for playback.

Audio content to be processed and/or played back by the playback device 300 may be received from an external source, such as via an audio line-in input connection (e.g., an auto-detecting 3.5 mm audio line-in connection) or the network interface 314.

The network interface 314 may be configured to facilitate a data flow between the playback device 300 and one or more other devices on a data network. As such, the playback device 300 may be configured to receive audio content over the data network from one or more other playback devices in communication with the playback device 300, network devices within a local area network, or audio content sources over a wide area network such as the Internet. In one example, the audio content and other signals transmitted and received by the playback device 300 may be transmitted in the form of digital packet data containing an Internet Protocol (IP)-based source address and IP-based destination addresses. In such a case, the network interface 314 may be configured to parse the digital packet data such that the data destined for the playback device 300 is properly received and processed by the playback device 300.

As shown, the network interface 314 may include wireless interface(s) 316 and wired interface(s) 318. The wireless interface(s) 316 may provide network interface functions for the playback device 300 to wirelessly communicate with other devices (e.g., other playback device(s), speaker(s), receiver(s), network device(s), control device(s) within a data network the playback device 300 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 318 may provide network interface functions for the playback device 300 to communicate over a wired connection with other devices in accordance with a communication protocol (e.g., IEEE 802.3). While the network interface 314 shown in FIG. 3 includes both wireless interface(s) 316 and wired interface(s) 318, the network interface 314 may in some embodiments include only wireless interface(s) or only wired interface(s).

In one example, the playback device 300 and one other playback device may be paired to play two separate audio components of audio content. For instance, playback device 300 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 300 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 300 is a playback device designed to render low frequency range audio content (i.e. a subwoofer), the playback device 300 may be consolidated with a playback device designed to render full frequency range audio content. In such a case, the full frequency range playback device, when consolidated with the low frequency playback device 300, may be configured to render only the mid and high frequency components of audio content, while the low frequency range playback device 300 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 3 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 200 of FIG. 2, the environment may have one or more playback zones, each with one or more playback devices. The media playback system 200 may be established with one or more playback zones, after which one or more zones may be added, or removed to arrive at the example configuration shown in FIG. 2. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 2, the balcony, dining room, kitchen, bathroom, office, and bedroom zones each have one playback device, while the living room and master bedroom zones each have multiple playback devices. In the living room zone, playback devices 204, 206, 208, and 210 may be configured to play audio content in synchrony as individual playback devices, as one or more bonded playback devices, as one or more consolidated playback devices, or any combination thereof. Similarly, in the case of the master bedroom, playback devices 222 and 224 may be configured to play audio content in synchrony as individual playback devices, as a bonded playback device, or as a consolidated playback device.

In one example, one or more playback zones in the environment of FIG. 2 may each be playing different audio content. For instance, the user may be grilling in the balcony zone and listening to hip hop music being played by the playback device 202 while another user may be preparing food in the kitchen zone and listening to classical music being played by the playback device 214. In another example, a playback zone may play the same audio content in synchrony with another playback zone. For instance, the user may be in the office zone where the playback device 218 is playing the same rock music that is being playing by playback device 202 in the balcony zone. In such a case, playback devices 202 and 218 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 200 may be dynamically modified, and in some embodiments, the media playback system 100 supports numerous configurations. For instance, if a user physically moves one or more playback devices to or from a zone, the media playback system 200 may be reconfigured to accommodate the change(s). For instance, if the user physically moves the playback device 202 from the balcony zone to the office zone, the office zone may now include both the playback device 218 and the playback device 202. The playback device 202 may be paired or grouped with the office zone and/or renamed if so desired via a control device such as the control devices 226 and 228. On the other hand, if the one or more playback devices are moved to a particular area in the home environment that is not already a playback zone, a new playback zone may be created for the particular area.

Further, different playback zones of the media playback system 200 may be dynamically combined into zone groups or split up into individual playback zones. For instance, the dining room zone and the kitchen zone 214 may be combined into a zone group for a dinner party such that playback devices 212 and 214 may render audio content in synchrony. On the other hand, the living room zone may be split into a television zone including playback device 204, and a listening zone including playback devices 206, 208, and 210, if the user wishes to listen to music in the living room space while another user wishes to watch television.

c. Example Control Devices

Figure 4:
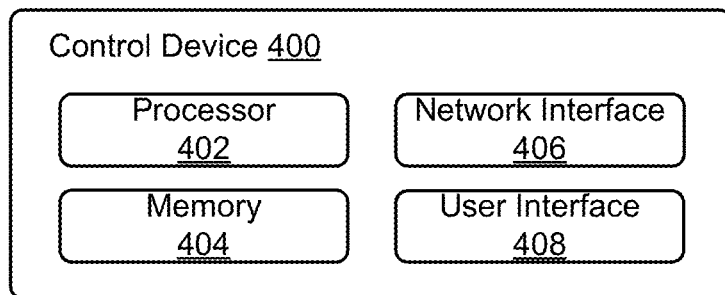
FIG. 4 shows a functional block diagram of an example control device.

FIG. 4 shows a functional block diagram of an example control device 400 that may be configured to be one or both of the control devices 226 and 228 of the media playback system 200. As shown, the control device 400 may include a processor 402, memory 404, a network interface 406, and a user interface 408. In one example, the control device 400 may be a dedicated controller for the media playback system 200. In another example, the control device 400 may be a network device on which media playback system controller application software may be installed, such as for example, an iPhone™, iPad™ or any other smart phone, tablet or network device (e.g., a networked computer such as a PC or Mac™).

The processor 402 may be configured to perform functions relevant to facilitating user access, control, and configuration of the media playback system 200. The memory 404 may be configured to store instructions executable by the processor 402 to perform those functions. The memory 404 may also be configured to store the media playback system controller application software and other data associated with the media playback system 200 and the user.

In one example, the network interface 406 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 406 may provide a means for the control device 400 to communicate with other devices in the media playback system 200. In one example, data and information (e.g., such as a state variable) may be communicated between control device 400 and other devices via the network interface 406. For instance, playback zone and zone group configurations in the media playback system 200 may be received by the control device 400 from a playback device or another network device, or transmitted by the control device 400 to another playback device or network device via the network interface 406. In some cases, the other network device may be another control device.

Playback device control commands such as volume control and audio playback control may also be communicated from the control device 400 to a playback device via the network interface 406. As suggested above, changes to configurations of the media playback system 200 may also be performed by a user using the control device 400. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 400 may sometimes be referred to as a controller, whether the control device 400 is a dedicated controller or a network device on which media playback system controller application software is installed.

Figure 5:
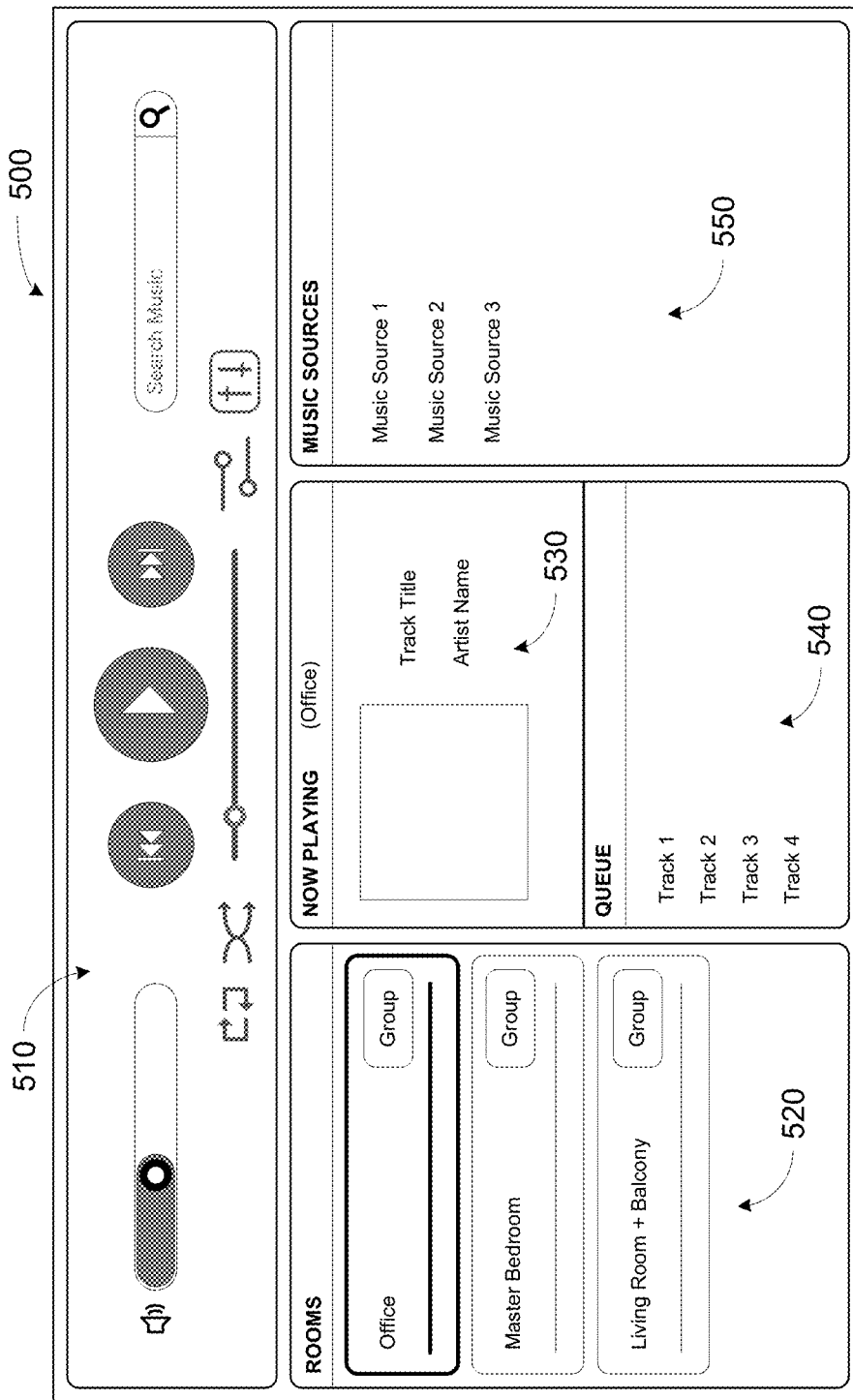
FIG. 5 shows an example controller interface.

The user interface 408 of the control device 400 may be configured to facilitate user access and control of the media playback system 200, by providing a controller interface such as the controller interface 500 shown in FIG. 5. The controller interface 500 includes a playback control region 510, a playback zone region 520, a playback status region 530, a playback queue region 540, and an audio content sources region 550. The user interface 500 as shown is just one example of a user interface that may be provided on a network device such as the control device 400 of FIG. 4 (and/or the control devices 226 and 228 of FIG. 2) and accessed by users to control a media playback system such as the media playback system 200. Other user interfaces of varying formats, styles, and interactive sequences may alternatively be implemented on one or more network devices to provide comparable control access to a media playback system.

The playback control region 510 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 510 may also include selectable icons to modify equalization settings, and playback volume, among other possibilities.

The playback zone region 520 may include representations of playback zones within the media playback system 200. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 500 are also possible. The representations of playback zones in the playback zone region 520 may be dynamically updated as playback zone or zone group configurations are modified.

The playback status region 530 may include graphical representations of audio content that is presently being played, previously played, or scheduled to play next in the selected playback zone or zone group. The selected playback zone or zone group may be visually distinguished on the user interface, such as within the playback zone region 520 and/or the playback status region 530. The graphical representations may include track title, artist name, album name, album year, track length, and other relevant information that may be useful for the user to know when controlling the media playback system via the user interface 500.

The playback queue region 540 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be re-associated with a new playback queue that is empty, or contains audio items from the playback queue associated with the established zone group before the established zone group was ungrouped. Other examples are also possible.

Referring back to the user interface 500 of FIG. 5, the graphical representations of audio content in the playback queue region 540 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 550 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 200 of FIG. 2, local music libraries on one or more network devices (such as a control device, a network-enabled personal computer, or a networked-attached storage (NAS), for example), streaming audio services providing audio content via the Internet (e.g., the media service servers 135-145), or audio sources connected to the media playback system via a line-in input connection on a playback device or network devise, among other possibilities.

In some embodiments, audio content sources may be regularly added or removed from a media playback system such as the media playback system 200 of FIG. 2. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

IV. Methods for Imposing Media-Item Share Restrictions

As discussed above, in some situations, it may be desirable to assign a share restriction to a plurality of media items to limit certain users' ability to access the plurality of media items.

Figure 6:
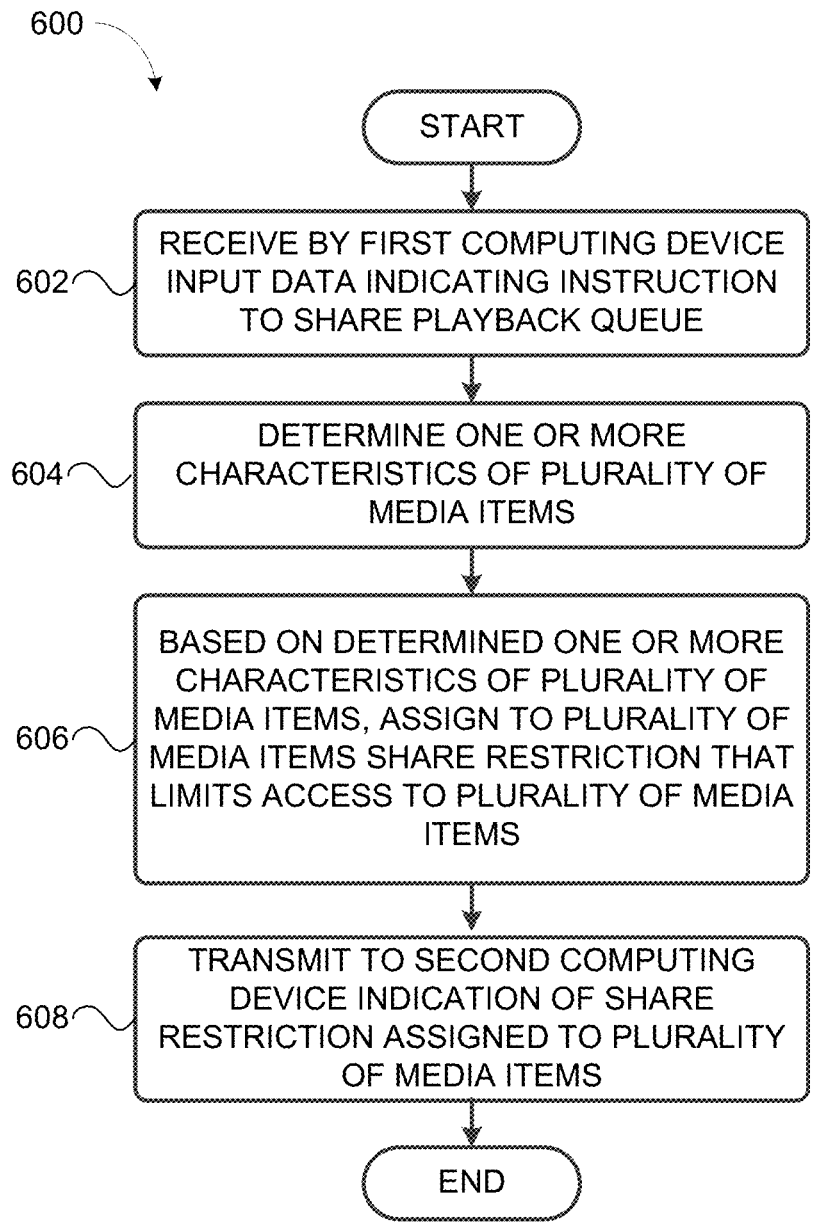
FIG. 6 shows a flow diagram of an example method.
Figure 8:
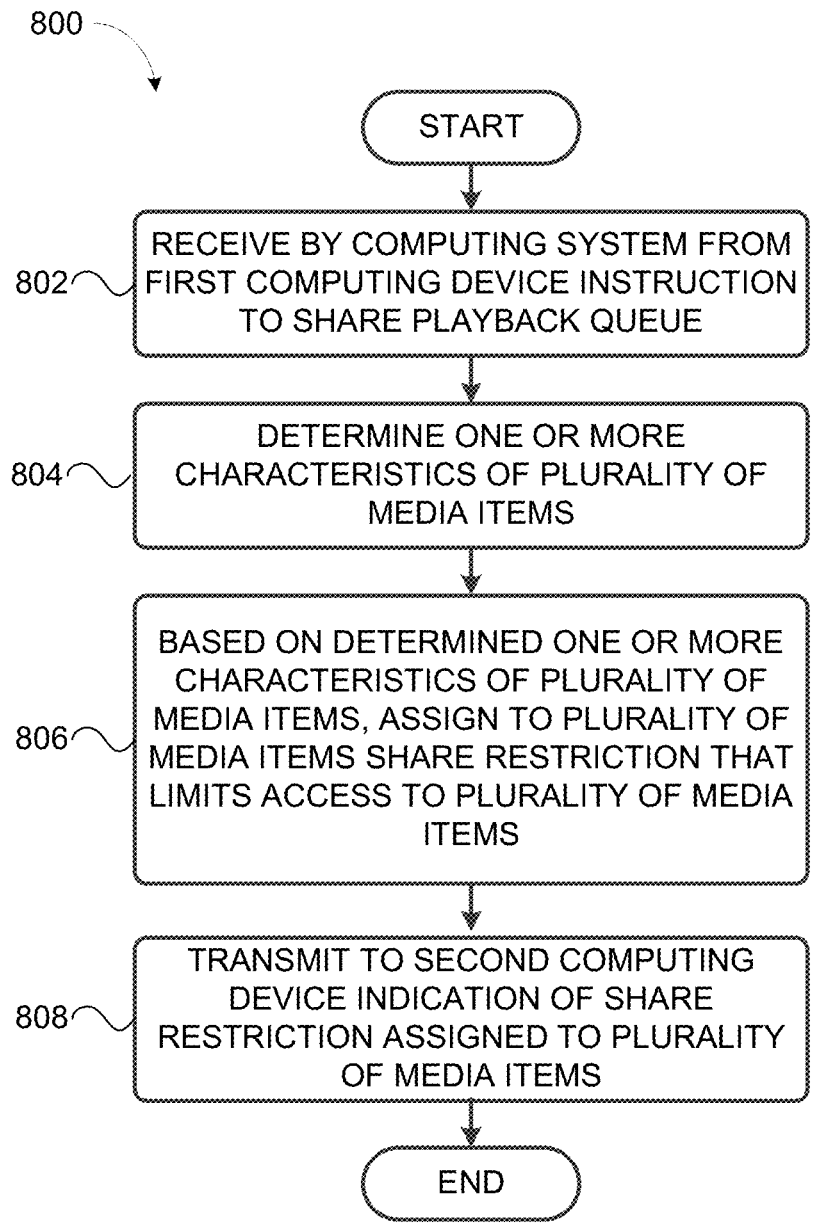
FIG. 8 shows a flow diagram of another example method.
Figure 9:
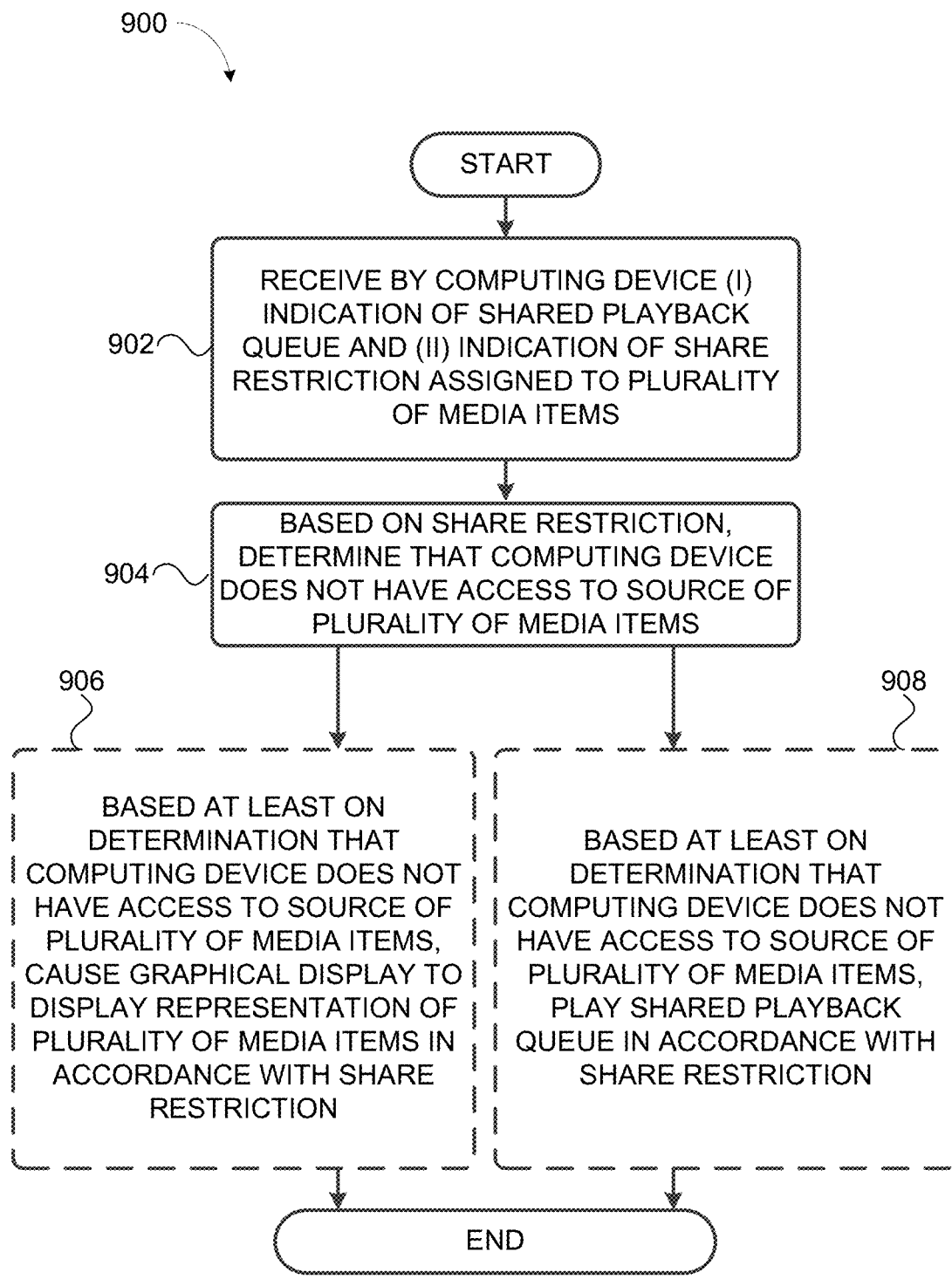
FIG. 9 shows a flow diagram of an example method.

For method 600 of FIG. 6, method 800 of FIG. 8, and method 900 of FIG. 9 and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the method 600 and other processes and methods disclosed herein, each block in FIG. 6 may represent circuitry that is wired to perform the specific logical functions in the process.

Furthermore, although the blocks are illustrated in sequential order, these blocks may also be performed in parallel, and/or in a different order than those described herein. Also, the various blocks may be combined into fewer blocks, divided into additional blocks, and/or removed based upon the desired implementation.

For clarity, the methods 600, 800, and 900 may be described herein with reference to FIGS. 7A-B and FIGS. 10A-C. It should be understood, however, that this is for purposes of example and explanation only and that the operations of the methods should not be limited by these figures.

1. First Example Method

The method 600 shown in FIG. 6 presents an embodiment of a method that may be implemented within the network configuration 100 by a playback device or control device (or a computing device running the media playback system controller application software discussed above) of one of the media playback systems 106-108. It should be understood that the method may be carried out in other suitable network configurations and/or by other suitable network elements as well. Method 600 may include one or more operations, functions, or actions as illustrated by one or more of blocks 602-608

The method 600 begins at block 602 with receiving by a first computing device input data indicating an instruction to share a playback queue, where the playback queue includes a plurality of media items. At block 604, the method 600 involves determining one or more characteristics of the plurality of media items, where at least one of the one or more characteristics indicates a source of the plurality of media items. At block 606, the method 600 involves, based on the determined one or more characteristics of the plurality of media items, assigning to the plurality of media items a share restriction that limits access to the plurality of media items. At block 608, the method 600 involves transmitting to a second computing device an indication of the share restriction assigned to the plurality of media items. The blocks shown in FIG. 6 are discussed in further detail below.

a. Receiving Input Data Indicating Instruction to Share Playback Queue

The method 600 begins at block 602 with receiving by a first computing device input data indicating an instruction to share a playback queue, where the playback queue includes a plurality of media items. The first computing device may be a computing device of the media playback system 106. In some implementations, one or more functions may be performed before the first computing device receives the input data indicating the instruction to share the playback queue.

Figure 7:
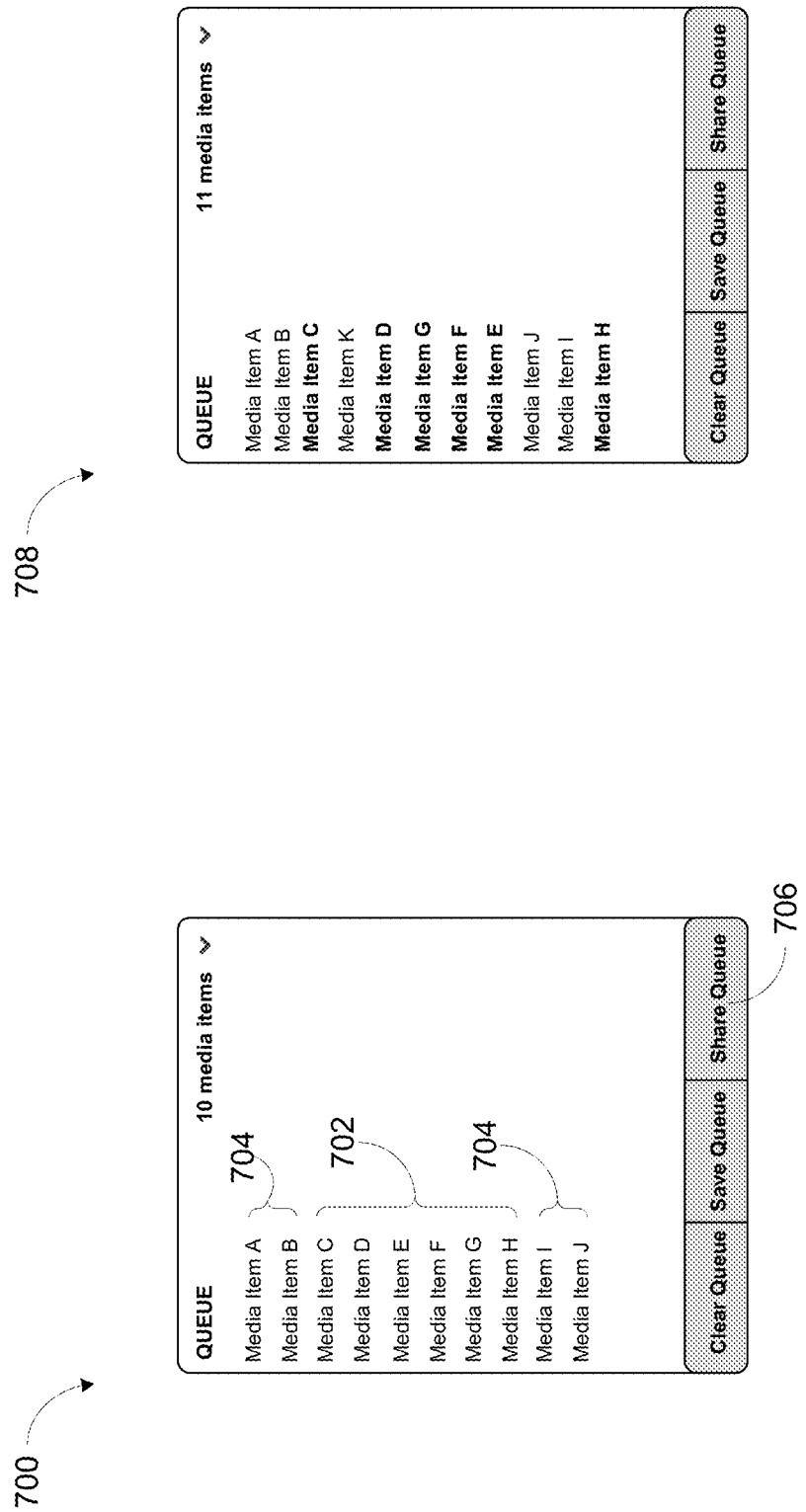
FIG. 7A shows a graphical representation of an example playback queue.
FIG. 7B shows a graphical representation of an example modified playback queue.

For example, before the first computing device receives such an input, the first computing device may receive one or more input data indicating an instruction to build the playback queue. A first user may have utilized a controller interface, such as the controller interface 500 of FIG. 5, to enter inputs indicating instructions to build the playback queue. FIG. 7A shows a graphical representation 700 of an example playback queue. As shown, the graphical representation 700 of the playback queue includes respective indicators of a plurality of media items 702 and respective indicators of additional media items 704.

As shown, the plurality of media items 702 may include particular media items, for example, media items C-H, that are in a particular order. The plurality of media items 702 may be representative of a playlist, which may have been created by the first media service, another subscriber of the first media service, or a third-party curator service, among other examples. In some implementations, the plurality of media items 702 may be proprietary to the creator of the plurality of media items. For example, the compilation of the individual media items and/or the order of the media items that make up the plurality of media items 702 may be copyrighted. As such, a subscription with the first media service and/or the third-party curator service (or perhaps an individual curator) may be required to access the plurality of media items 702.

The plurality of media items 702 may have been added to the playback queue in response to the first user selecting the plurality of media items 702 while using the controller interface 500 to access media provided by a first media service (e.g., media service provided by the media service server 110 of FIG. 1). The first user may subscribe to the first media service, and thus, the first computing device may be associated with the subscription such that the first computing device has access to the media provided by the first media service.

Alternatively, the plurality of media items 702 may have been added to the playback queue in response to the first user selecting the plurality of media items 702 while using the controller interface to access playlists provided by a third-party curator service. A third-party curator service may provide playlists created by a professional curator or perhaps a celebrity or the like. The first user may subscribe to the third-party curator service, and consequently, the first computing device may have access to playlists provided by the third-party curator.

In example implementations, a media service may provide curated playlists. That is, a curator may create playlists and allow the media service to provide the media items that make up the playlist. In such examples, to gain access to the playlists, a user may need a subscription to the media service or the curator, or perhaps both.

In any event, after the playback queue is built or selected (e.g., a playback queue may only include a plurality of media items representative of a playlist), the first computing device may receive the input data indicating the instruction to share the playback queue. For example, the first computing device may receive from the first user an input indicating that the first user would like to share the playback queue with another user. For instance, the first user may have selected "Share Queue" icon 706 to instruct the first computing device to share the playback queue represented in FIG. 7A. Although not shown, after the first user selected the "Share Queue" icon 706, the first user may have also identified to whom the playback queue should be shared with.

b. Determining One or More Characteristics of Plurality of Media Items

Returning back to FIG. 6, at block 604, the method 600 involves determining one or more characteristics of the plurality of media items, where at least one of the one or more characteristics indicates a source of the plurality of media items. In example implementations, the source of the plurality of media items may be a media service that provides the plurality of media items or a curator, among other examples.

In addition to one of the characteristics indicating a source of the plurality of media items, other characteristics are also possible. In general, the one or more characteristics indicate information that may reflect that the plurality of media items is proprietary and/or should not be shared without at least some limitation. Examples of other characteristics may include a total number of media items in the plurality of media items, artists of media items in the plurality of media items, and record labels that produced media items in the plurality of media items. Other examples are also possible.

In some examples, at least one of the one or more characteristics may indicate that credentials associated with the source of the plurality of media items are required to access the plurality of media items. For example, such a characteristic may indicate that a computing device should be associated with a subscription to the source (e.g., media service provider or curator) of the plurality of media items before accessing the plurality of media items. Additionally or alternatively, at least one of the one or more characteristics may include a restriction setting. The restriction setting may be configured to limit or perhaps prevent access to the plurality of media items when a computing device does not have subscription credentials. Other example characteristics are also possible.

Determining the one or more characteristics may be performed in a number of ways. In some examples, this determination may be based on metadata that is included with the plurality of media items. One or more of the media items of the plurality of media items may include metadata that identifies the source of the plurality of media items and/or any other information that indicates the above discussed other characteristics of the plurality of media items.

The first computing device may use such metadata to determine the one or more characteristics.

In other examples, this function may additionally or alternatively involve the first computing device determining that the plurality of media items includes an access characteristic. The first computing device may have assigned the access characteristic to the plurality of media items when the plurality of media items was originally added to the playback queue. That is, in response to a user selecting a plurality of media items representative of a proprietary playlist, the first computing device may have assigned the access characteristic.

The access characteristic may operate to notify the first computing device that a share restriction may apply to the plurality of media items in the event that there is an attempt to share the plurality of media items with another computing device. As such, determining that the plurality of media items includes an access characteristic may cause the first computing device to perform further functions to determine other characteristics of the plurality of media items.

In yet other examples, determining the one or more characteristics may additionally or alternatively involve the first computing device referencing a server that stores a database of proprietary playlists. The first computing device may communicate with such a server via the cloud network 114. In some examples, the first computing device (or perhaps the server itself) may determine whether the playback queue includes particular media items in a particular order that match any of the proprietary playlists stored in the database. In other examples, where the plurality of media items includes an access characteristic, the first computing device may determine whether the plurality of media items match any of the proprietary playlists stored in the database. In the event that the first computing device determines that such a match exists, the first computing device may then determine the source, any restriction settings, etc. of the matching proprietary playlist. Other examples of determining the one or more characteristics of the plurality of media items are also possible.

c. Assigning to Plurality of Media Items a Share Restriction

At block 606, the method 600 involves, based on the determined one or more characteristics of the plurality of media items, assigning to the plurality of media items a share restriction that limits access to the plurality of media items. For example, based on the source of the plurality of media items and/or any of the other above-discussed determined characteristics, the first computing device may assign to the plurality of media items the share restriction to limit access to the plurality of media items by computing devices that do not subscribe to the source of the plurality of media items, such as a computing device of the media playback system 108.

In some examples, the share restriction may be an indicator indicating that access to the plurality of media items is limited when a computing device does not subscribe to the source of the plurality of media items or a media service the provides the plurality of media items. The share restriction may be included in metadata that is included with the plurality of media items. In other examples, the share restriction may be a mechanism that prevents access to the plurality of media items when a computing device does not subscribe to the source and/or a provider of the plurality of media items. For instance, such a share restriction may operate to encrypt the plurality of media items such that credentials associated with the source and/or a provider of the plurality of media items are required to access them. Other examples of a share restriction are possible.

The share restriction may include one or more different types of restrictions that limit access to the plurality of media items by non-subscribing computing devices, such as a computing device of the media playback system 108. The share restriction may include a display restriction that limits the display of the plurality of media items by the second computing device. The display restriction may limit the extent to which the second computing device is able to display the plurality of media items or the display restriction may prevent the second computing device from being able to display the plurality of media items altogether.

Additionally or alternatively, the share restriction may include a playback restriction that limits the playback of the plurality of media items by non-subscribing computing devices. The playback restriction may limit the extent to which the second computing device is able to playback the plurality of media items. For example, the playback restriction may limit the playback of the plurality of media items by the second computing device to a portion of one or more of the media items. In another example, the playback restriction may allow playback of the media items but may play an audio and/or visual advertisement during playback of one or more of the media items. The advertisement may be associated with the source of the plurality of media items and/or may provide information to the second user regarding how to obtain full access to the plurality of media items (e.g., by subscribing to the source of the plurality of media items). The playback restriction may alternatively prevent playback of the plurality of media items by the second computing device altogether. Other examples are possible as well.

d. Transmitting Indication of Share Restriction

At block 608, the method 600 involves transmitting to a second computing device an indication of the share restriction assigned to the plurality of media items. The first computing device may transmit to the second computing device (e.g., a computing device of the media playback system 108) the indication of the share restriction via the cloud network 114. The first computing device may transmit the indication of the share restriction directly to the second computing device, or the first computing device may transmit the indication of the share restriction indirectly to the second computing device via the media system server 102.

In any event, in some examples, the indication of the share restriction may take the form of a restriction message that identifies the media items that the share restriction applies to. The restriction message may also identify the extent of the share restriction (e.g., whether the share restriction includes a display and/or playback restriction), and/or a media or curator service subscription that may avoid the share restriction (e.g., a subscription to the source and/or a provider of the plurality of media items or perhaps a subscription to a companion service).

In other examples, the indication of the share restriction may be transmitted along with an indication of the playback queue. The indication of the playback queue may include respective indications of the plurality of media items and of any additional media items included in the playback queue. Alternatively, the indication of the playback queue may include respective indications for each media item of the playback queue. In such an example, the indication of the share restriction may be sent as a separate message (e.g., similar to the above-discussed restriction message), or perhaps the indication of the share restriction may be included in metadata that is included with the respective indications of the media items of the playback queue.

In any event, the indication of the share restriction may be operable to cause the second computing device to have limited access to the plurality of media items. In this way, the share restriction may facilitate maintaining the proprietary nature of the plurality of media items.

e. Additional Functions

Although not shown in FIG. 6, additional functions may be carried out with or in addition to method 600. For example, after the first computing device assigns the plurality of media items the share restriction, the first computing device may receive input data indicating a modification of the plurality of media items. For instance, after the first user added the plurality of media items to the playback queue, the first user may then use the controller interface 500 to modify the plurality of media items.

To illustrate, FIG. 7B shows a graphical representation 708 of an example modified playback queue. As shown, the plurality of media items 702 from FIG. 7A has been modified (for clarity, the original media items from the plurality of media items 702 are bolded). A modification may include removing one or more of the plurality of media items (e.g., "Media Item H" is shown as removed from the plurality of media items), adding one or more additional media items (e.g., "Media Item K" is shown as added to the plurality of media items), and/or reordering one or more of the plurality of media items (e.g., "Media Item E" and "Media Item G" are shown as reordered). Other example modifications are possible.

Based at least on the modification to the plurality of media items, the first computing device may remove the share restriction from the plurality of media items. In this way, the first user may freely share the playback queue, where the media items in the playback queue have been sufficiently modified.

In some examples, removing the share restriction may first involve the first computing device determining that the plurality of media items has been modified beyond a predetermined modification threshold. In practice, this function may involve the first computing device maintaining a modification count and updating the modification count for each modification that is made to the plurality of media items. As the modification count is updated, the first computing device may compare the modification count to the predetermined modification threshold. The modification threshold may include a predetermined number of media items removed, a predetermined number of media items added, a predetermined degree of reordering of media items, or a predetermined total number of modifications, among other possibilities.

In some examples, certain modifications may be weighted differently. For example, removing a media item may be weighted more than reordering a media item, which itself may be weighted more than adding a media item. Other examples of relative weights are also possible.

When the first computing device determines that the plurality of media items has been modified beyond the predetermined modification threshold, the first computing device may remove the share restriction. In this respect, the first computing device may be configured to make a determination as to when modifications cause a set of media items to no longer resemble the plurality of media items that is proprietary.

2. Second Example Method

The method 800 shown in FIG. 8 presents an embodiment of a method that may be implemented within the network configuration 100 by the media system server 102. It should be understood that the method may be carried out on other suitable network configurations and/or by other suitable network elements as well. The method 800 may include one or more operations, functions, or actions as illustrated by one or more of blocks 802-808.

The method 800 begins at block 802 with receiving by a computing system from a first computing device an instruction to share a playback queue, where the playback queue includes a plurality of media items. At block 804, the method 800 involves determining one or more characteristics of the plurality of media items, where at least one of the one or more characteristics indicates a source of the plurality of media items. At block 806, the method 800 involves, based on the determined one or more characteristics of the plurality of media items, assigning to the plurality of media items a share restriction that limits access to the plurality of media items. At block 808, the method 800 involves transmitting to a second computing device an indication of the share restriction assigned to the plurality of media items. The blocks shown in FIG. 8 are discussed in further detail below.

a. Receiving Instruction to Share Playback Queue

The method 800 begins at block 802 with receiving by a computing system from a first computing device an instruction to share a playback queue, where the playback queue includes a plurality of media items. For example, the media system server 102 may receive the instruction to share the playback queue from a first computing device of the media playback system 106 via the cloud network 114. The first computing device may have transmitted to the media system server 102 the instruction after receiving input data indicating the instruction to share the playback queue. The first computing device may have received the input data in the same or a similar manner as discussed above with reference to block 602 of FIG. 6.

The instruction to share the playback queue may include an indication of the playback queue. Broadly speaking, the indication of the playback queue may be used by the media system server 102 to identify and/or locate media items of the playback queue. The playback queue may be the same as or similar to the playback queue discussed above.

In some examples, the indication of the playback queue may include an indication of the plurality of media items. Such an indication may be an indicator specific to a particular media or curator service that may be used to retrieve the plurality of media items. For example, the indicator may be a pointer or the like to the plurality of media items, such as a URI or URL. In other examples, the indication of the plurality of media items may include respective indicators for each of the media items of the plurality of media items that may be used to retrieve the media items individually. In example implementations, the indication of the playback queue may also include respective indicators of one or more additional media items included in the playback queue. Such indicators may operable to locate in the network configuration 100 the one or more additional media items. For example, the indicators may be media-item pointers or the like that identify respective network locations of the additional media items.

The instruction to share the playback queue may also include an identifier of an intended recipient of the shared playback queue. Such an identifier may identify a user to whom the playback queue should be shared with. Based on the identifier, the media system server 102 may be configured to determine a network location, such as an IP address, of a computing device associated with the user. In other examples, the identifier of the intended recipient of the shared playback queue may itself identify the location of the computing device associated with the user. Other examples are also possible.

b. Determining One or More Characteristics of Plurality of Media Items

At block 804, the method 800 involves determining one or more characteristics of the plurality of media items, where at least one of the one or more characteristics indicates a source of the plurality of media items. This function may be performed in a similar manner as discussed above with reference to block 604 of FIG. 6.

c. Assigning to Plurality of Media Items a Share Restriction

At block 806, the method 800 involves, based on the determined one or more characteristics of the plurality of media items, assigning to the plurality of media items a share restriction that limits access to the plurality of media items. This function may be performed in a similar manner as discussed above with reference to block 606 of FIG. 6.

d. Transmitting Indication of Share Restriction

At block 808, the method 800 involves transmitting to a second computing device an indication of the share restriction assigned to the plurality of media items. The media system server 102 may transmit to the second computing device (e.g., a computing device of the media playback system 108) the indication of the share restriction via the cloud network 114. The share restriction may be the same as or similar to the share restriction discussed above with reference to block 608 of FIG. 6. The media system server 102 may also transmit to the second computing device an indication of the playback queue, which may be the same as or different to the indication of the playback queue from block 802.

Although not shown in FIG. 8, additional functions may be carried out with or in addition to method 800. The media system server 102 may be configured to perform additional functions similar to those discussed above with reference to FIG. 6.

V. Methods for Implementing Media-Item Share Restrictions

In some implementations, after a media-item share restriction is imposed on a plurality of media items of a playback queue, a computing device may receive an indication of a share restriction assigned to the plurality of media items. Thereafter, the computing device may attempt to access the plurality of media items, and in some situations, the computing device may be limited or prevented from such access.

The method 900 shown in FIG. 9 presents an embodiment of a method that may be implemented within the network configuration 100 by a playback device or control device (or a computing device running the media playback system controller application software discussed above) of one of the media playback systems 106-108. It should be understood that the method may be carried out on other suitable network configurations and/or by other suitable network elements as well. The method 900 may include one or more operations, functions, or actions as illustrated by one or more of blocks 902-908.

The method 900 begins at block 902 with receiving by a computing device (i) an indication of a shared playback queue, where the indication of the shared playback queue includes at least an indication of a plurality of media items and an indication of one or more additional media items, and (ii) an indication of a share restriction assigned to the plurality of media items. At block 904, the method 900 involves, based on the share restriction, determining that the computing device does not have access to a source of the plurality of media items. In certain implementations, at block 906, the method 900 involves, based at least on the determination that the computing device does not have access to the source of the plurality of media items, causing a graphical display to display a representation of the plurality of media items in accordance with the share restriction. In other implementations, the method 900 may additionally or alternatively involve, at block 908, based at least on the determination that the computing device does not have access to the source of the plurality of media items, playing the shared playback queue in accordance with the share restriction. The blocks shown in FIG. 9 are discussed in further detail below.

a. Receiving Shared Playback Queue and Indication of Share Restriction Assigned to Plurality of Media Items The method 900 begins at block 902 with receiving by a computing device (i) an indication of a shared playback queue, where the indication of the shared playback queue includes at least an indication of a plurality of media items and an indication of one or more additional media items, and (ii) an indication of a share restriction assigned to the plurality of media items. In some examples, the shared playback queue may only include a plurality of media items and thus, the indication of the shared playback queue may not include an indication of one or more additional media items.

The computing device may be a computing device of the media playback system 108. The computing device may have received the indication of the shared playback queue and the indication of the share restriction from a computing device of the media playback system 106 (e.g., after block 608 of FIG. 6) and/or the media system server 102 (e.g., after block 808 of FIG. 8). The indication of the shared playback queue and the indication of the share restriction may be the same as or similar to the indications and/or indicators discussed above.

b. Determining Computing Device does not have Access

At block 904, the method 900 involves, based on the share restriction, determining that the computing device does not have access to a source of the plurality of media items. This function may be performed a number of manners.

In some examples, this function may first involve the computing device determining whether the computing device is associated with a subscription to a media service provider and/or curator associated with the share restriction. For instance, the share restriction may identify that a subscription to a first media service and/or curator is required to access the plurality of media items. The computing device may use the share restriction to determine whether it is associated with such a subscription. When the computing device determines that it is not associated with such a subscription, the computing device may in turn determine that it does not have access to the source and/or curator of the plurality of media items.

In examples where the share restriction indicates that non-subscribing users have limited access to the plurality of media items, after the computing device determines that it is not associated with an appropriate subscription, the computing device itself may impose any access restriction in accordance with the share restriction. In other examples where the share restriction is configured to prevent non-subscribing users from accessing the plurality of media items, it may be unnecessary for the computing device to determine whether it is associated with an appropriate subscription. This may be because the share restriction itself may limit the computing device's ability to access the plurality of media items.

After block 904, as indicated by the dashed lines, the method 900 may involve either the block 906 or 908, or perhaps both. That is, the method 900 need not involve both of the blocks 906 and 908, but in some implementations the method 900 may include both.

c. Causing Graphical Display to Display in Accordance with Share Restriction

In certain implementations, at block 906, the method 900 involves, based at least on the determination that the computing device does not have access to the source of the plurality of media items, causing a graphical display to display a representation of the plurality of media items in accordance with the share restriction. Such a representation may be shown on a controller interface, such as the controller interface 500.

In some examples, before this function is performed, the computing device may use the share restriction to determine one or more display parameters for the plurality of media items that limit the display of the plurality of media items. The one or display parameters may control if and to what extent the plurality of media items are displayed. For example, the display parameters may gray out the plurality of media item and/or cause the plurality of media items to not be selectable. Alternatively, the display parameters may block out the plurality of media items altogether. Based at least on the determination that the computing device does not have access to the source of the plurality of media items, the computing device may cause the graphical display to display the representation of the plurality of media items in accordance with one or more display parameters.

Figures 10A, 10B:
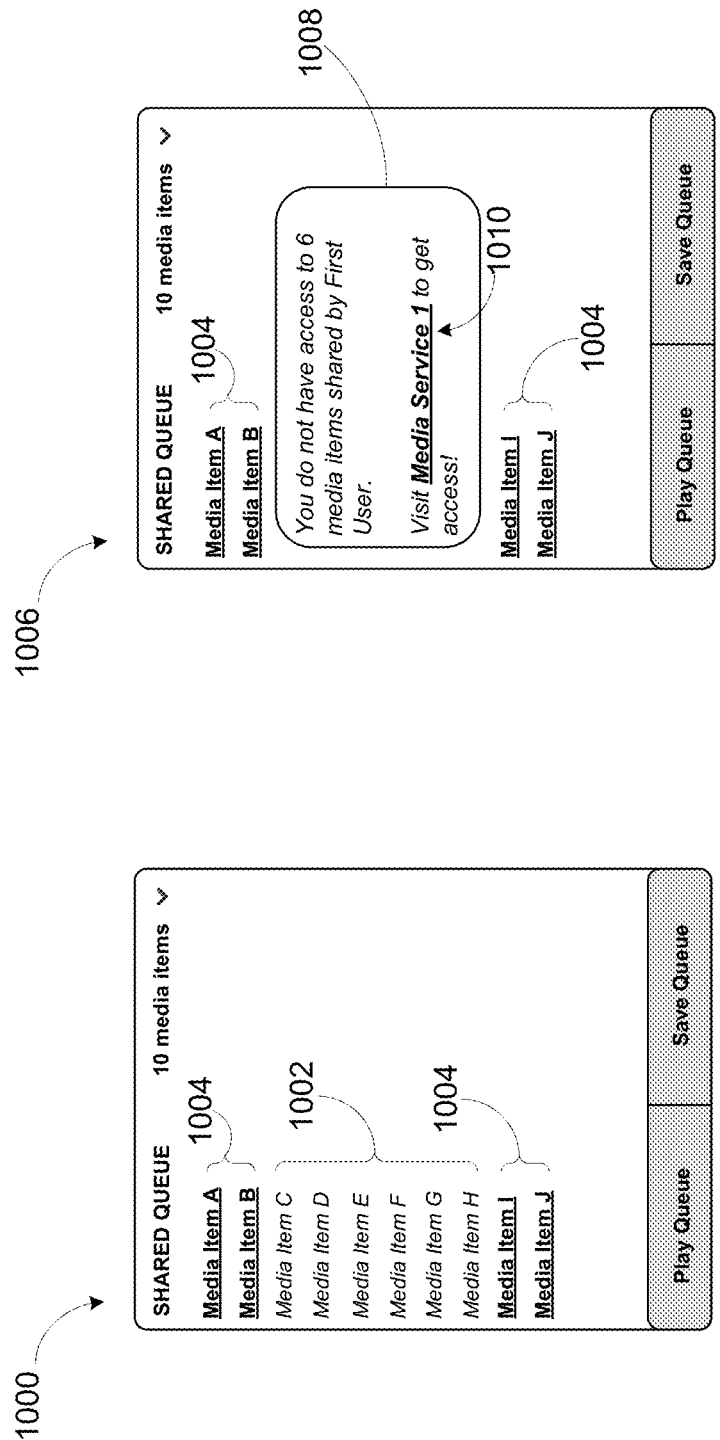
FIG. 10A shows a graphical representation of an example shared playback queue displayed in accordance with a share restriction.
FIG. 10B shows another graphical representation of a shared example playback queue displayed in accordance with a share restriction.
Figure 10C:
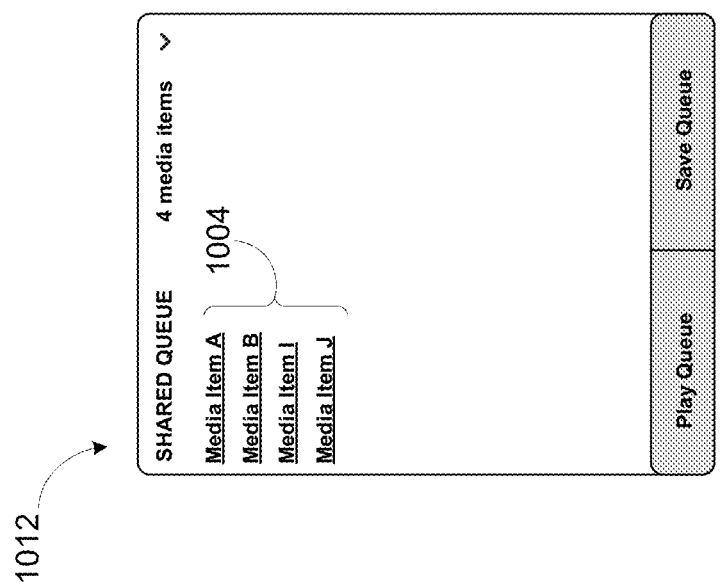
FIG. 10C shows yet another graphical representation of a shared example playback queue displayed in accordance with a share restriction.

To illustrate, FIGS. 10A-C show example graphical representations of an example shared playback queue displayed in accordance with a share restriction. Such representations may be a result of the first user sharing the playback queue shown in FIG. 7A.

As shown in FIG. 10A, a graphical representation 1000 of a shared playback queue includes a graphical representation 1002 of the plurality of media items and a graphical representation 1004 of additional media items. In this example, the graphical representation 1004 of the additional media items includes respective media-item identifiers for the additional media items that are selectable, while the graphical representation 1002 of the plurality of media items includes respective media-item identifiers for the plurality of media items that are not selectable. In some examples, selecting a selectable media-item identifier may cause the computing device to playback the corresponding media item. Furthermore, the graphical representation 1002 of the plurality of media items displays the respective media-item identifiers as grayed out.

FIG. 10B shows another graphical representation 1006 of the shared playback queue that includes the graphical representation 1004 of the additional media items from FIG. 10A and a graphical representation 1008 of the plurality of media items. As shown, the graphical representation 1008 includes an indication that the plurality of media items is not accessible as well as an indication 1010 of a source of the plurality of media items from which access to the plurality of media items may be obtained. In this example, the indication 1010 of the source is selectable and may hyperlink to a webpage associated with the source of the plurality of media items where a user may create an account and thereby subscribe to the source (e.g., a media service and/or curator).

FIG. 10C shows yet another graphical representation 1012 of the shared playback queue that includes the graphical representation 1004 of the additional media items from FIG. 10A. In this example, the representation of the plurality of media items in accordance with the share restriction is a null representation. As such, the second user may be unaware of the fact that the first user attempted to share the plurality of media items.

It should be understood that FIGS. 10A-10C are only a few possible examples of graphical representations of a shared playback queue displayed in accordance with a share restriction and that such figures are shown for purposes of example and explanation and should not be construed as limiting. Various other representations are possible.

d. Playing Shared Playback Queue in Accordance with Share Restriction

Returning back to FIG. 9, in example implementations, the method 900 may additionally or alternatively involve, at block 908, based at least on the determination that the computing device does not have access to the source of the plurality of media items, playing the shared playback queue in accordance with the share restriction. In some examples, the computing device itself may play the shared playback queue in accordance with the share restriction. In other examples, the computing device may cause another device, such as a playback device of the media playback system 108, to play the shared playback queue in accordance with the share restriction.

In some examples, before this function is performed, the computing device may use the share restriction to determine one or more playback parameters for the plurality of media items that limit the playback of the plurality of media items. The one or display parameters may control if and to what extent a computing device may play the plurality of media items. For example, the playback parameters may limit the playback to samples of the plurality of media items (e.g., a predefined duration of playback, such as 20 seconds) and/or insert advertisements associated with the source of the plurality of media items into each of the media items. In other examples, the playback parameters may prevent the playback of the plurality of media items altogether. Based at least on the determination that the computing device does not have access to the source of the plurality of media items, the computing device may play the plurality of media items in accordance with one or more playback parameters.

In practice, playing the shared playback queue in accordance with the share restriction may involve playing the one or more additional media items and not playing the plurality of media items. Alternatively, this function may involve playing a sample of one or more of the media items of the plurality of media items. Additionally or alternatively, this function may involve playing the plurality of media items along with advertisements associated with the source of the plurality of media items. Other examples of playback in accordance with the share restriction are also possible.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As discussed above, the examples provided herein relate to a share restriction on a plurality of media items that is part of a playback queue. In one aspect, a method is provided. The method involves (a) receiving by a first computing device input data indicating an instruction to share a playback queue, wherein the playback queue comprises a plurality of media items, (b) determining one or more characteristics of the plurality of media items, wherein at least one of the one or more characteristics indicates a source of the plurality of media items, (c) based on the determined one or more characteristics of the plurality of media items, assigning to the plurality of media items a share restriction that limits access to the plurality of media items, and (d) transmitting to a second computing device an indication of the share restriction assigned to the plurality of media items.

In another aspect, a non-transitory computer-readable medium is provided. The non-transitory computer-readable medium having instructions stored thereon that are executable by a first computing device to cause the first computing device to perform functions, the functions include (a) receiving input data indicating an instruction to share a playback queue, wherein the playback queue comprises a plurality of media items, (b) determining one or more characteristics of the plurality of media items, wherein at least one of the one or more characteristics indicates a source of the plurality of media items, (c) based on the determined one or more characteristics of the plurality of media items, assigning to the plurality of media items a share restriction that limits access to the plurality of media items, and (d) transmitting to a second computing device an indication of the share restriction assigned to the plurality of media items.

In an example aspect, a method is provided. The method involves (a) receiving by a computing system from a first computing device an instruction to share a playback queue, wherein the playback queue comprises a plurality of media items, (b) determining one or more characteristics of the plurality of media items, wherein at least one of the one or more characteristics indicates a source of the plurality of media items, (c) based on the determined one or more characteristics of the plurality of media items, assigning to the plurality of media items a share restriction that limits access to the plurality of media items, and (d) transmitting to a second computing device an indication of the share restriction assigned to the plurality of media items.

In yet another example aspect, another method is provided. The method involves (a) receiving by a computing device (i) an indication of a shared playback queue, wherein the indication of the shared playback queue includes at least an indication of a plurality of media items and an indication of one or more additional media items, and (ii) an indication of a share restriction assigned to the plurality of media items, (b) based on the share restriction, determining that the computing device does not have access to a source of the plurality of media items, and (c) based at least on the determination that the computing device does not have access to the source of the plurality of media items, playing the shared playback queue in accordance with the share restriction.

In one other example aspect, an additional method is provided. The method involves (a) receiving by a computing device (i) an indication of a shared playback queue, wherein the indication of the shared playback queue includes at least an indication of a plurality of media items and an indication of one or more additional media items, and (ii) an indication of a share restriction assigned to the plurality of media items, (b) based on the share restriction, determining that the computing device does not have access to a source of the plurality of media items, and (c) based at least on the determination that the computing device does not have access to the source of the plurality of media items, causing a graphical display to display a representation of the plurality of media items in accordance with the share restriction.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method to be performed by a first media playback system, the method comprising:
receiving, via a network interface of the first media playback system from a mobile device, data representing an instruction to queue a curated playlist of audio tracks to a first playback queue for playback via one or more first playback devices of the first media playback system, wherein the first playback queue defines a playback sequence for media items in the first playback queue, wherein a first user account of a first cloud service is associated with the first media playback system, wherein the curated playlist of audio tracks consists of a proprietary set of audio tracks defined and arranged into a particular sequence by the first cloud service, and wherein the audio tracks of the curated playlist are streamable from one or more servers of a second cloud service;
based on receiving the data representing an instruction to queue the curated playlist of audio tracks to the first playback queue, adding, via the first media playback system, respective representations of each audio track within the curated playlist to the first playback queue, wherein the first playback queue is maintained in data storage of the one or more first playback devices, and wherein the respective representations of each audio track within the curated playlist indicate respective network locations of each audio track at the one or more servers of the second cloud service;
receiving, via the network interface of the first media playback system, data indicating an instruction to share the first playback queue with a second media playback system that comprises one or more second playback devices, wherein the first playback queue comprises the curated playlist of audio tracks, and wherein a second user account of the first cloud service is associated with the first media playback system;
based on receiving the data indicating the instruction to share the first playback queue with the second media playback system, determining (i) whether the first user account of the first cloud service is a subscriber to the first cloud service and (ii) whether the second user account of the first cloud service is a subscriber to the first cloud service; and
based on (a) determining that the first user account is a subscriber to the first cloud service and (b) determining that the second user account of the first cloud service is not a subscriber to the first cloud service, sending, via the network interface of the first media playback system to the second media playback system, one or more instructions to (i) add respective representations of each audio track in the first playback queue to a second playback queue for playback via the one or more second playback devices of the second media playback system, wherein the second playback queue defines a playback sequence for media items in the second playback queue, and (ii) apply a share restriction to the respective representations of the audio tracks within the curated playlist that are queued in the second playback queue of the second media playback system, wherein applying the share restriction to the respective representations of the audio tracks within the curated playlist that are queued in the second playback queue of the second media playback system causes the one or more second playback devices to have limited access according to the share restriction to the audio tracks within the curated playlist that are queued in the second playback queue, and wherein access to other audio tracks in the second playback queue is not limited according to the share restriction.

2. The method of claim 1, further comprising:
receiving, via the network interface of the first media playback system, data indicating an instruction to share the first playback queue with a third media playback system that comprises one or more third playback devices, wherein a third user account of the first cloud service is associated with the third media playback system;
based on receiving the data indicating the instruction to share the first playback queue with the second media playback system, determining (i) whether the first user account of the first cloud service is a subscriber to the first cloud service and (ii) whether the third user account of the first cloud service is a subscriber to the first cloud service; and
based on (a) determining that the first user account is a subscriber to the first cloud service and (b) determining that the third user account of the first cloud service is a subscriber to the first cloud service, sending, via the network interface of the first media playback system to the second media playback system, one or more instructions to (i) add respective representations of each audio track in the first playback queue to a third playback queue for playback via the one or more third playback devices of the third media playback system, wherein the third playback queue defines a playback sequence for media items in the third playback queue, and (ii) forego applying the share restriction to the respective representations of the audio tracks within the curated playlist that are queued in the third playback queue of the third media playback system.

3. The method of claim 1, wherein applying the share restriction to the respective representations of the audio tracks within the curated playlist that are queued in the second playback queue of the second media playback system comprises assigning a playback restriction to prevent playback of audio tracks within the curated playlist that are queued in the second playback queue by the one or more second playback devices of the second media playback system.

4. The method of claim 1, wherein applying the share restriction to the respective representations of the audio tracks within the curated playlist that are queued in the second playback queue of the second media playback system comprises assigning a modification restriction to prevent modification of an order of the second playback queue.

5. The method of claim 1, wherein the first cloud service comprises multiple first cloud servers configured to provide a media playback system cloud service to a plurality of media playback systems, and wherein the second cloud service comprises multiple second cloud servers configured to provide a streaming audio cloud service.

6. The method of claim 5, wherein the first media playback system comprises one or more servers of the media playback system cloud service.

7. The method of claim 1, wherein the first cloud service comprises multiple first cloud servers configured to provide a playlist curation service that provides curated playlists from one or more additional cloud services comprising the second cloud service, and wherein the second cloud service comprises multiple second cloud servers configured to provide a streaming audio cloud service.

8. The method of claim 1, further comprising:
after sending the one or more instructions to apply the share restriction to the respective representations of the audio tracks within the curated playlist that are queued in the second playback queue of the second media playback system, receiving, via the network interface from the mobile device, instructions to add additional audio tracks to the first playback queue;
based on the receiving the instructions to add additional audio tracks to the first playback queue, (i) adding respective representations of each additional audio track to the first playback queue, wherein the respective representations of each additional audio track within the curated playlist indicate respective network locations of each additional audio track and (ii) determining whether the first playback queue has been modified beyond a pre-determined modification threshold indicating a degree of similarity between the curated playlist of audio tracks and the first playback queue; and
based on (a) receiving the instructions to add additional audio tracks to the first playback queue and (b) determining that the first playback queue has been modified beyond the pre-determined modification threshold, sending, via the network interface of the first media playback system to the second media playback system, one or more instructions to (i) add respective representations of each additional audio track in the first playback queue to the second playback queue for playback via the one or more second playback devices of the second media playback system and (ii) remove the share restriction from the respective representations of the audio tracks within the curated playlist that are queued in the second playback queue of the second media playback system.

9. The method of claim 8, wherein determining whether the first playback queue has been modified beyond the pre-determined modification threshold indicating the degree of similarity between the curated playlist of audio tracks and the first playback queue comprises determining whether the additional audio tracks added to the first playback queue to alter the proprietary set of audio tracks defined and arranged into the particular sequence by the first cloud service beyond the pre-determined modification threshold.

10. The method of claim 8, wherein the particular streaming audio service is a first streaming audio service, and wherein the second media playback system has access to the audio tracks within the curated playlist that are queued in the second playback queue from a third cloud service, and wherein the one or more second playback devices play back the audio tracks within the curated playlist that are queued in the second playback queue from the third cloud service after the share restriction is removed.

11. A system comprising:
one or more processors;
a network interface; and
data storage having instructions stored therein that are executable by the system to cause the system to perform functions comprising:
receiving, via the network interface from a mobile device, data representing an instruction to queue a curated playlist of audio tracks to a first playback queue for playback via one or more first playback devices of a first media playback system, wherein the first playback queue defines a playback sequence for media items in the first playback queue, wherein a first user account of a first cloud service is associated with the first media playback system, wherein the curated playlist of audio tracks consists of a proprietary set of audio tracks defined and arranged into a particular sequence by the first cloud service, and wherein the audio tracks of the curated playlist are streamable from one or more servers of a second cloud service;
based on receiving the data representing an instruction to queue the curated playlist of audio tracks to the first playback queue, adding, via the first media playback system, respective representations of each audio track within the curated playlist to the first playback queue, wherein the first playback queue is maintained in data storage of the one or more first playback devices, and wherein the respective representations of each audio track within the curated playlist indicate respective network locations of each audio track at the one or more servers of the second cloud service;
receiving, via the network interface of the first media playback system, data indicating an instruction to share the first playback queue with a second media playback system that comprises one or more second playback devices, wherein the first playback queue comprises the curated playlist of audio tracks, and wherein a second user account of the first cloud service is associated with the first media playback system;

based on receiving the data indicating the instruction to share the first playback queue with the second media playback system, determining (i) whether the first user account of the first cloud service is a subscriber to the first cloud service and (ii) whether the second user account of the first cloud service is a subscriber to the first cloud service; and based on (a) determining that the first user account is a subscriber to the first cloud service and (b) determining that the second user account of the first cloud service is not a subscriber to the first cloud service, sending, via the network interface of the first media playback system to the second media playback system, one or more instructions to (i) add respective representations of each audio track in the first playback queue to a second playback queue for playback via the one or more second playback devices of the second media playback system, wherein the second playback queue defines a playback sequence for media items in the second playback queue, and (ii) apply a share restriction to the respective representations of the audio tracks within the curated playlist that are queued in the second playback queue of the second media playback system, wherein applying the share restriction to the respective representations of the audio tracks within the curated playlist that are queued in the second playback queue of the second media playback system causes the one or more second playback devices to have limited access according to the share restriction to the audio tracks within the curated playlist that are queued in the second playback queue, and wherein access to other audio tracks in the second playback queue is not limited according to the share restriction.

12. The system of claim 11, wherein the functions further comprise:

receiving, via the network interface of the first media playback system, data indicating an instruction to share the first playback queue with a third media playback system that comprises one or more third playback devices, wherein a third user account of the first cloud service is associated with the third media playback system;

based on receiving the data indicating the instruction to share the first playback queue with the second media playback system, determining (i) whether the first user account of the first cloud service is a subscriber to the first cloud service and (ii) whether the third user account of the first cloud service is a subscriber to the first cloud service; and based on (a) determining that the first user account is a subscriber to the first cloud service and (b) determining that the third user account of the first cloud service is a subscriber to the first cloud service, sending, via the network interface of the first media playback system to the second media playback system, one or more instructions to (i) add respective representations of each audio track in the first playback queue to a third playback queue for playback via the one or more third playback devices of the third media playback system, wherein the third playback queue defines a playback sequence for media items in the third playback queue, and (ii) forego applying the share restriction to the respective representations of the audio tracks within the curated playlist that are queued in the third playback queue of the third media playback system.

13. The system of claim 11, wherein applying the share restriction to the respective representations of the audio tracks within the curated playlist that are queued in the second playback queue of the second media playback system comprises assigning a playback restriction to prevent playback of audio tracks within the curated playlist that are queued in the second playback queue by the one or more second playback devices of the second media playback system.

14. The system of claim 11, wherein applying the share restriction to the respective representations of the audio tracks within the curated playlist that are queued in the second playback queue of the second media playback system comprises assigning a modification restriction to prevent modification of an order of the second playback queue.

15. The system of claim 11, wherein the first cloud service comprises multiple first cloud servers configured to provide a media playback system cloud service to a plurality of media playback systems, and wherein the second cloud service comprises multiple second cloud servers configured to provide a streaming audio cloud service.

16. The system of claim 15, wherein the first media playback system comprises one or more servers of the media playback system cloud service.

17. The system of claim 11, wherein the first cloud service comprises multiple first cloud servers configured to provide a playlist curation service that provides curated playlists from one or more additional cloud services comprising the second cloud service, and wherein the second cloud service comprises multiple second cloud servers configured to provide a streaming audio cloud service.

18. The system of claim 11, wherein the functions further comprise:

after sending the one or more instructions to apply the share restriction to the respective representations of the audio tracks within the curated playlist that are queued in the second playback queue of the second media playback system, receiving, via the network interface from the mobile device, instructions to add additional audio tracks to the first playback queue;

based on the receiving the instructions to add additional audio tracks to the first playback queue, (i) adding respective representations of each additional audio track to the first playback queue, wherein the respective representations of each additional audio track within the curated playlist indicate respective network locations of each additional audio track and (ii) determining whether the first playback queue has been modified beyond a pre-determined modification threshold indicating a degree of similarity between the curated playlist of audio tracks and the first playback queue; and based on (a) receiving the instructions to add additional audio tracks to the first playback queue and (b) determining that the first playback queue has been modified beyond the pre-determined modification threshold, sending, via the network interface of the first media playback system to the second media playback system, one or more instructions to (i) add respective representations of each additional audio track in the first playback queue to the second playback queue for playback via the one or more second playback devices of the second media playback system and (ii) remove the share restriction from the respective representations of the audio tracks within the curated playlist that are queued in the second playback queue of the second media playback system.

19. The system of claim 18, wherein determining whether the first playback queue has been modified beyond the pre-determined modification threshold indicating the degree of similarity between the curated playlist of audio tracks and the first playback queue comprises determining whether the additional audio tracks added to the first playback queue to alter the proprietary set of audio tracks defined and arranged into the particular sequence by the first cloud service beyond the pre-determined modification threshold.

20. The system of claim 18, wherein the particular streaming audio service is a first streaming audio service, and wherein the second media playback system has access to the audio tracks within the curated playlist that are queued in the second playback queue from a third cloud service, and wherein the one or more second playback devices play back the audio tracks within the curated playlist that are queued in the second playback queue from the third cloud service after the share restriction is removed.

* * * * *